(12) United States Patent
Antkowiak et al.

(10) Patent No.: US 12,268,335 B2
(45) Date of Patent: Apr. 8, 2025

(54) KITCHEN DEVICE

(71) Applicant: Breville Pty Limited, Alexandria (AU)

(72) Inventors: Margaret Antkowiak, Alexandria (AU); Richard Llewelyn Jones, Alexandria (AU); Lochana Subasekara Widanagamage Don, Alexandria (AU); Sebastien Tiburzio, Alexandria (AU)

(73) Assignee: BREVILLE PTY LIMITED, Alexandria (AU)

( * ) Notice: Subject to any disclaimer, the term of this patent is extended or adjusted under 35 U.S.C. 154(b) by 791 days.

(21) Appl. No.: 17/442,348

(22) PCT Filed: Mar. 23, 2020

(86) PCT No.: PCT/AU2020/050277
§ 371 (c)(1),
(2) Date: Sep. 23, 2021

(87) PCT Pub. No.: WO2020/191437
PCT Pub. Date: Oct. 1, 2020

(65) Prior Publication Data
US 2022/0175194 A1     Jun. 9, 2022

(30) Foreign Application Priority Data

Mar. 25, 2019   (AU) ................................ 2019900990
Jun. 28, 2019   (AU) ................................ 2019902299

(51) Int. Cl.
*A47J 43/07*        (2006.01)
*H02J 50/10*        (2016.01)
*H02J 50/90*        (2016.01)
*A47J 43/046*       (2006.01)
*A47J 43/08*        (2006.01)

(52) U.S. Cl.
CPC ....... *A47J 43/0777* (2013.01); *A47J 43/0766* (2013.01); *H02J 50/10* (2016.02); *H02J 50/90* (2016.02); *A47J 43/0465* (2013.01); *A47J 43/085* (2013.01)

(58) Field of Classification Search
CPC .. A47J 43/0766; A47J 43/0761; A47J 43/085; A47J 43/0465; A23N 1/02
USPC .................................................... 99/510, 513
See application file for complete search history.

(56) References Cited

U.S. PATENT DOCUMENTS 4,174,073 A   11/1979  Maher et al.
4,371,118 A    2/1983  Podell et al.
(Continued)

FOREIGN PATENT DOCUMENTS

WO   WO-2017144914 A1     8/2017
WO   WO-2018016880 A1 *   1/2018  ............ A47J 27/004

OTHER PUBLICATIONS

International Search Report for Application No. PCT/AU2020/050277 dated Jun. 9, 2020.
Chinese Office Action for CN application No. 202080023890.1, dated May 27, 2024, 12 pages.

*Primary Examiner* — Reginald Alexander
(74) *Attorney, Agent, or Firm* — Tarolli, Sundheim, Covell & Tummino LLP

(57) ABSTRACT

A kitchen device (100) including: abase (102) having a mechanism (118) that is operated using electrical power to cause processing of food; a vessel (104) removably mounted on the base (102) and including a bottom wall (108), a side wall (110) extending upwardly from the bottom wall (108) to a rim (112) so as to provide a space (114) to receive the food to be processed, with the rim (112) surrounding an opening (116) to the space (114); a lid (106) removably coupled to the rim (112) so as to at least partially close the opening (116); and an interlock system (120) operatively associated with the mechanism (118) to permit the delivery of the electric power to the mechanism (118), the system (120) including a first interlock circuit (122) and a second interlock circuit (124), wherein delivery of the electric (Continued)

power to the mechanism (118) is permitted by the completion of the first interlock circuit (122) and activation of the second interlock circuit (124), wherein the first interlock circuit (122) includes a first coupling (126) to complete the first circuit (122), the first coupling (126) including a first portion (128) mounted to the lid (106) and a second portion (130) mounted to the vessel (104) adjacent the rim (112) so that the first portion (128) is located adjacent the second portion (130) when the lid (106) is coupled to the rim (112) thereby completing the first circuit (122), and wherein the second interlock circuit (124) includes a second coupling (136) to activate the second interlock circuit (124), the second coupling (136) including a first portion (138) that is part of the second interlock circuit (124) and mounted to the base (102), the first portion (138) being operatively associated with a second portion (140) that is mounted to the vessel (104) and part of the first interlock circuit (122), wherein completion of the first interlock circuit (122) causes operation of the second portion (140) of the second coupling (136), thereby causing operation of the first portion (138) of the second coupling (136) to thus activate the second interlock circuit (124) and permit delivery of the electric power to the mechanism (118).

16 Claims, 26 Drawing Sheets

(56) References Cited

U.S. PATENT DOCUMENTS

| | | | |
|---|---|---|---|
| 4,741,482 A | 5/1988 | Bertin et al. | |
| 6,629,492 B1* | 10/2003 | Li | A47J 43/0777 366/601 |
| 2004/0100862 A1 | 5/2004 | Arroubi et al. | |
| 2015/0265983 A1 | 9/2015 | Fleming | |
| 2018/0020875 A1* | 1/2018 | Kolar | A47J 43/0777 366/279 |
| 2018/0255975 A1* | 9/2018 | Kolar | H04B 5/72 |
| 2020/0275807 A1* | 9/2020 | Kolar | A47J 43/046 |

* cited by examiner

KITCHEN DEVICE

FIELD

This invention relates to a kitchen device.

BACKGROUND

Kitchen devices frequently feature an interlock that detects whether a lid is secured to the top of a vessel to close an opening defined by a rim of the vessel. Presently, these devices are equipped with mechanical interlocks which typically require a large number of complex parts and moving mechanisms. Such designs require the parts and mechanisms to operate with higher accuracy and smaller tolerance to avoid, for example, food material jamming in the interlock. Mechanical interlocks are also difficult to design in a way that enables them to be safely cleaned in a dishwasher without causing part deformations. Similarly, in some designs, the electrical connection to the lid or handle that is required is prone to faults or incomplete connection.

Kitchen devices are also increasingly demanded to be multi-functional, however the regulatory environment for different operations in a kitchen changes, depending on the type of kitchen device, and the type of operation. Thus, kitchen devices often need to conform to the most stringent safety regulation of their multi-functional purpose, or the lowest bar of operational capability, to operate safely and within regulations. Further, kitchen devices having accessories of varying geometries have difficulties in placing interlock connections between the kitchen device and accessory at a position where all accessories can satisfactorily close the interlock.

SUMMARY OF INVENTION

It is an object of the present invention to substantially overcome, or at least ameliorate, one or more disadvantages of existing arrangements.

In a first aspect, the present invention provides a kitchen device including:

a base having a mechanism that is operated using electrical power to cause processing of food;

a vessel removably mounted on the base and including a bottom wall, a side wall extending upwardly from the bottom wall to a rim so as to provide a space to receive the food to be processed, with the rim surrounding an opening to the space;

a lid removably coupled to the rim so as to at least partially close the opening; and an interlock system operatively associated with the mechanism to permit the delivery of the electric power to the mechanism, the system including a first interlock circuit and a second interlock circuit, wherein delivery of the electric power to the mechanism is permitted by the completion of the first interlock circuit and activation of the second interlock circuit, wherein the first interlock circuit includes a first coupling to complete the first circuit, the first coupling including a first portion mounted to the lid and a second portion mounted to the vessel adjacent the rim so that the first portion is located adjacent the second portion when the lid is coupled to the rim thereby completing the first circuit, and wherein the second interlock circuit includes a second coupling to activate the second interlock circuit, the second coupling including a first portion that is part of the second interlock circuit and mounted to the base, the first portion being operatively associated with a second portion that is mounted to the vessel and part of the first interlock circuit, wherein completion of the first interlock circuit causes operation of the second portion of the second coupling, thereby causing operation of the first portion of the second coupling to thus activate the second interlock circuit and permit delivery of the electric power to the mechanism.

Preferably, the lid includes a lid base that engages the rim, with the first portion of the first coupling being mounted to the lid base.

Preferably, the lid includes
a lid base to engage the rim,
a feed tube extending from the lid base and communicating with the space to deliver food to the space through the feed tube, and
a pusher member slidably received in the feed tube to move the food along the feed tube to the space,
wherein the first portion and second portion of the first coupling include electrical contacts on the lid base and vessel, respectively, and
wherein the first coupling further includes:
a third portion associated with the feed tube, and
a fourth portion associated with the pusher member, such that the first interlock circuit is completed when the pusher member is in the feed tube and the lid is coupled to the rim.

Preferably, the first interlock circuit further includes a receiver coil and the base includes a transmitter coil, wherein the receiver coil is configured to receive electrical power from the associated transmitter coil to operate the first portion of the second coupling when the first interlock circuit is completed.

Preferably, the first portion of the second coupling includes at least one transmitter arranged in a watertight manner; and
the second portion of the second coupling includes at least one receiver operatively associated with the at least one transmitter when the vessel is located on the base to activate the second interlock circuit when the first interlock circuit is completed.

Preferably, the at least one transmitter includes an infrared (IR) light emitting diode, and wherein the at least one receiver includes an IR sensitive photodiode.

Preferably, the at least one transmitter includes a radio-frequency (RF) transmitter, and wherein the at least one receiver includes a radio-frequency (RF) receiver.

Preferably, the second interlock circuit further comprises a plurality of transistors connected in series to operate a relay to permit delivery of the electric power to the mechanism, each transistor having a base line connected to the first portion of the second coupling so that operation of the first portion of the second coupling causes a current to flow through the plurality of transistors, thereby activating the second interlock circuit and operating the relay.

Preferably, each base line is connected to a first plurality of resistors connected in series, and wherein the base lines of all transistors commonly connect to a second plurality of resistors connected in series before connecting to a source of electrical power.

Preferably, the second plurality of resistors includes a first portion of resistors connected in series and a second portion of resistors connected in parallel.

Preferably, the kitchen device further includes:
at least one sensor mounted to the base, the at least one sensor includes a vessel sensor configured to determine whether the vessel is received on the base; and a processor located within the base configured to receive an indication from the vessel sensor that the vessel is received on the base, wherein the processor is configured to prevent delivery of the electric power to the mechanism.

Preferably, the at least one sensor comprises at least one of:

a load sensor that determines a load of the vessel:

a temperature sensor that determines a temperature of the vessel; and a proximity sensor that determines a presence of the vessel.

Preferably, the mechanism includes a motor.

Preferably, the mechanism includes a heating element.

Preferably, the kitchen device includes a plurality of first portions of the second coupling, and a plurality of second portions of the second coupling.

Preferably, any second portion of the second coupling is adapted to operate any first portion of the second coupling.

In a second aspect, the present invention provides a method of permitting delivery of electric power to a mechanism of a kitchen device for processing food, the kitchen device having:

a base, the mechanism mounted in the base and operable using electrical power to cause processing of food;

a vessel removably mounted on the base and including a bottom wall, a side wall extending upwardly from the bottom wall to a rim so as to provide a space to receive the food to be processed, with the rim surrounding an opening to the space;

a lid removably coupled to the rim so as to at least partially close the opening;

a first interlock circuit located in the vessel; and a second interlock circuit located in the base, the method comprising the steps of:

coupling the vessel to the base, thereby providing electrical power to the first interlock circuit;

coupling the lid to the vessel, thereby completing the first interlock circuit; and after completion of the first interlock circuit, sending a non-contact output that activates the second interlock circuit thereby permitting delivery of electric power to the mechanism.

In a third aspect, the present invention provides a motor-operated kitchen device, the kitchen device including:

a base having a motor;

a vessel removably received on the base, the vessel having a bottom wall and a sidewall extending upwardly therefrom, the bottom wall and sidewall defining a space to receive ingredients, the sidewall extends upwardly to a rim, the rim defining an opening to the space;

a shaft drivingly coupled to the motor and extending into the space, the shaft being configured for rotation about an upright axis;

a translating member at least partly received by the shaft and movable relative to the shaft between a first position and a second position, the translating member being biased towards the first position;

a lid configured to be received on the rim to close the opening, the lid having an interlock portion located such that the interlock portion moves the translating member to the second position when the lid is received on the rim; and an interlock sensor configured to determine whether the translating member is in the second position, wherein the motor is only operable when the interlock sensor determines that the translating member is in the second position.

Preferably, the kitchen device further includes an interlock couple, the interlock couple comprising a first member in the vessel and attached to the translating member, and a second member in the base, wherein movement of the translating member from the first to the second position, and therefore movement of the first member from a first position to a second position causes movement of the second member from a first position to a second position, and wherein the interlock sensor is configured to determine whether the second member is in the second position to determine whether the translating member is in the second position.

Preferably, the second member is biased towards the first position.

Preferably, the first member includes a first magnet and the second member includes a second magnet, the first magnet and second magnet being arranged with like poles facing each other.

Preferably, the first member includes a first magnet and the second member includes a second magnet, the first magnet and second magnet being arranged with unlike poles facing each other.

Preferably, the first and second magnets are ring-shaped and arranged concentrically about the axis.

Preferably, the interlock sensor includes a switch.

Preferably, the interlock portion includes a lid magnet cooperating with an upper magnet attached to the translating member to move the translating member to the second position.

Preferably, the interlock portion includes a pin.

In a fourth aspect, the present invention provides a kitchen device including:

a base to connect to a mains power source, the base including:

a motor to receive electrical power from the mains power source, the motor having a motor shaft to turn at a motor speed;

a base electromagnetic coil to receive electrical power from the mains power source; and a microprocessor to control the base electromagnetic coil and also to control the motor in accordance with a motor control profile; and an accessory removably connected to the base so that the accessory is operable by the motor and including:

a transmission circuit including an accessory electromagnetic coil and to produce an accessory identification signal indicative of a type of accessory, wherein the microprocessor is configured to:

control the base electromagnetic coil to interact with the accessory electromagnetic coil, to thereby receive the accessory identification signal; and set the motor control profile as a function of the accessory identification signal.

Preferably, the microprocessor sets the motor control profile so that the motor speed is zero, when no accessory identification signal is received by the microprocessor, thereby providing a safety interlock.

Preferably, the accessory further includes:

a relay electromagnetic coil to interact with the accessory electromagnetic coil, and wherein the microprocessor controls the base electromagnetic coil to interact indirectly with the accessory electromagnetic coil via the relay electromagnetic coil.

Preferably, the kitchen device further includes a sensor located on the accessory to provide a sensor signal to the transmission circuit, and wherein the microprocessor controls the base electromagnetic coil to interact with the accessory electromagnetic coil, thereby receiving the sensor signal, and set the motor control profile as a function of the sensor signal.

Preferably, the sensor includes at least one of:
a strain gauge;
an accelerometer;
a thermocouple; and/or
a radiofrequency identification chip.

Preferably, the kitchen device further includes:
a heater located in the base, such that the heater is in thermal communication with the accessory when the accessory is located connected to the base, and
wherein the microprocessor sets a heater control profile as a function of the accessory identification signal, and
wherein the microprocessor sets the heater control profile as a function of the sensor signal.

Preferably, the accessory includes a safety device to interact with the transmission circuit, the safety device being movable to a safe configuration that improves safety of a user during operation of the accessory,
wherein the transmission circuit produces an interlock signal indicative of whether the safety device is in the safe configuration, and
wherein the microprocessor controls the base electromagnetic coil to receive the interlock signal and sets the motor control profile as a function of the interlock signal.

Preferably, the accessory includes a plurality of safety devices and the transmission circuit produces a respective interlock signal indicative of whether each safety device is in the respective safe configuration.

Preferably, the relay electromagnetic coil is located in the safety device such that, when the safety device is in the safe configuration, the microprocessor controls the base electromagnetic coil to interact indirectly with the accessory electromagnetic coil via the relay electromagnetic coil to receive the interlock signal and the accessory identification signal.

In a fifth aspect, the present invention provides a kitchen device having a base and an accessory removably connected to the base, the kitchen device including:
a base encoder/decoder located in the base, and
an accessory encoder/decoder located in the accessory, and
a microprocessor to control the base and accessory encoder/decoder to interact with each other when the accessory is connected to the base,
wherein the microprocessor is also configured to:
control the base encoder to send a first transmission to the accessory decoder, the first transmission containing information encoded in frequency shift keying; and
control the accessory encoder to send a second transmission to the base decoder, the second transmission containing information encoded in amplitude shift keying.

Preferably, the base encoder/decoder includes a base electromagnetic coil, and
the accessory encoder/decoder includes an accessory electromagnetic coil,
wherein the controller encodes information contained in the second transmission by controlling the accessory electromagnetic coil to draw varying levels of load, resulting in corresponding varying levels of potential in the base electromagnetic coil.

BRIEF DESCRIPTION OF DRAWINGS

Preferred embodiments of the present invention will now be described, by way of examples only, with reference to the accompanying drawings.

DESCRIPTION OF EMBODIMENTS

Figure 1:
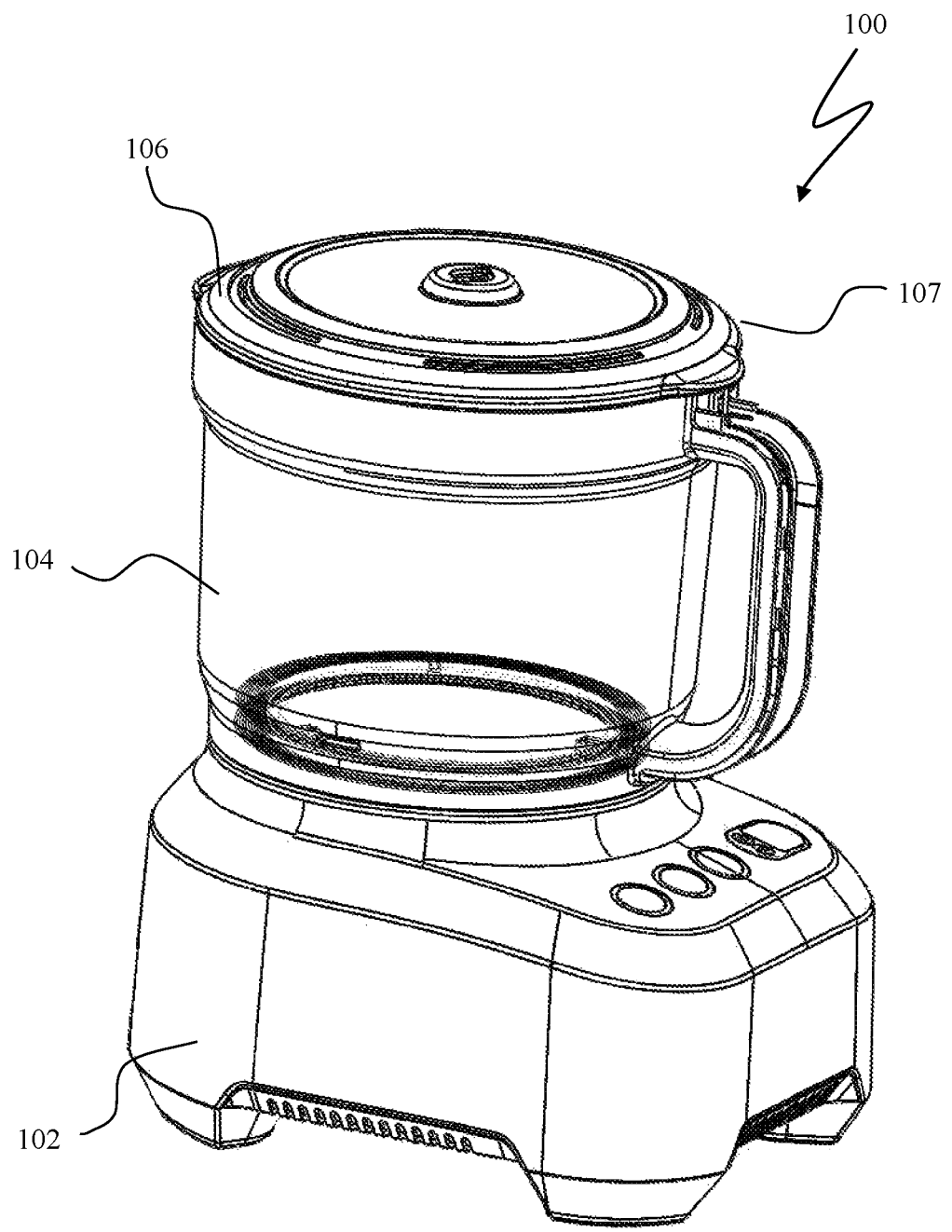
FIG. 1 is a perspective view of a kitchen device according to an embodiment of the present invention.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of documents or devices which form public knowledge through their respective publication and/or use. Such should not be interpreted as a representation by the present inventor(s) or the patent applicant that such documents or devices in any way form part of the common general knowledge in the art.

Figure 2:
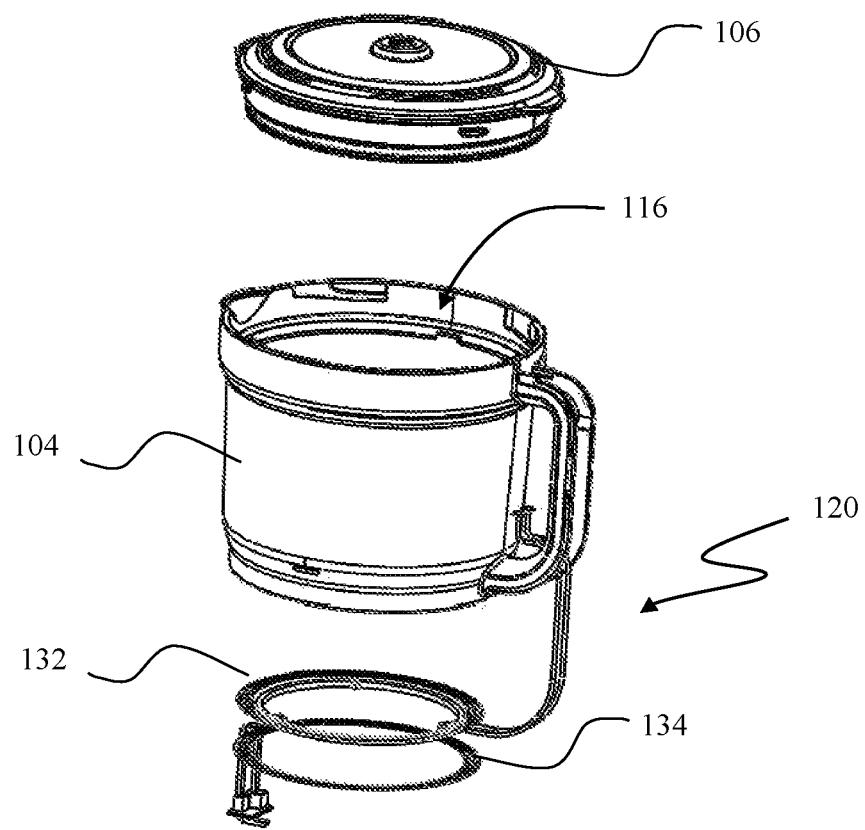
FIG. 2 is an exploded perspective view of the kitchen device of FIG. 1.
Figure 2:
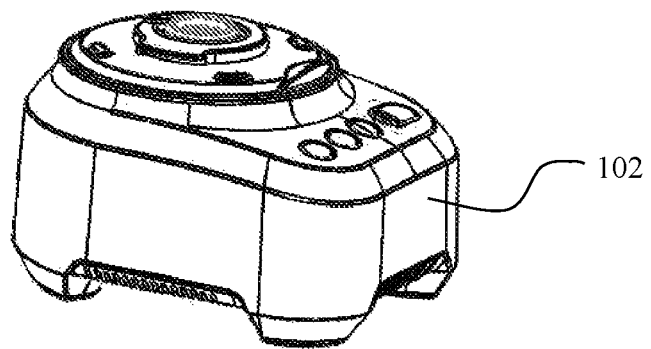
Figure 3:
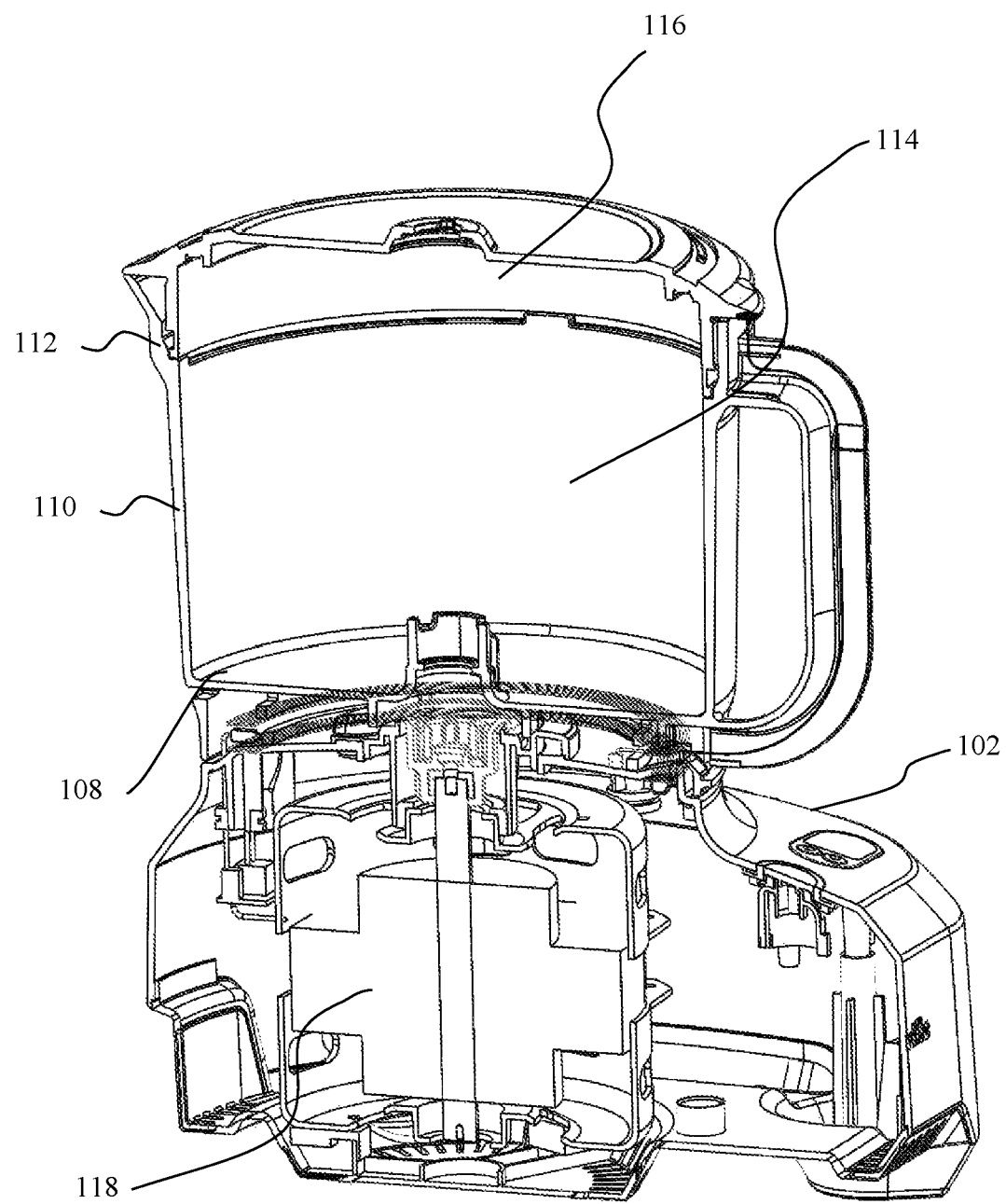
FIG. 3 is a perspective section view of the kitchen device of FIG. 1.

FIGS. 1 to 3 show a kitchen device 100 including a base 102, a vessel 104, and a lid 106. The vessel 104 is removably mounted on the base 102. As seen in FIG. 3, the vessel 104 includes a bottom wall 108, a side wall 110 extending upwardly from the bottom wall 108 to a rim 112 so as to provide a space 114 to receive the food to be processed. The rim 112 surrounds an opening 116 to the space 114. The lid 106 has a lid base 107 and is removably coupled to the rim 112 with the lid base 107 so as to close the opening 116.

As seen in FIG. 3, the base 102 houses a mechanism 118 that is operated using electrical power to cause processing of food contained in the space 114. The mechanism 118 may be a motor, for example. The motor may be coupled to a shaft extending through the bottom wall into the space to drive the shaft about an axis and, in turn, drive a blade system coupled to the shaft. In an alternative embodiment, the mechanism may be a heating element for providing heat to the food to be processed. Other embodiments may include both a motor and a heating element.

Figure 12:
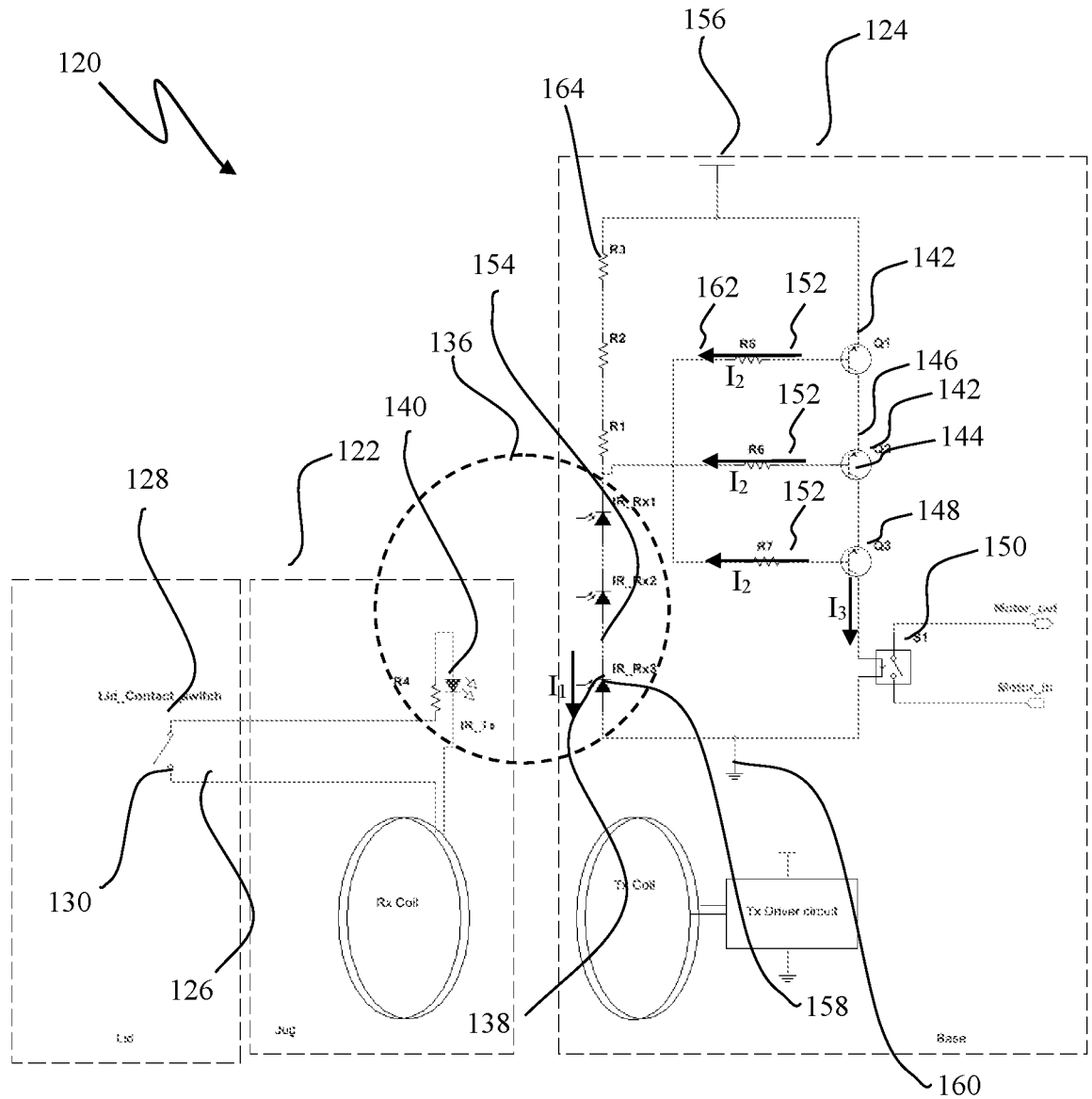
FIG. 12 is a schematic circuit diagram of an interlock system of the kitchen device of FIG. 1.

As best shown in FIG. 12, the kitchen device 100 further includes an interlock system 120 to permit or allow delivery of electrical power to the mechanism 118. The interlock system 120 includes a first interlock circuit 122 and a second interlock circuit 124.

Figure 4:
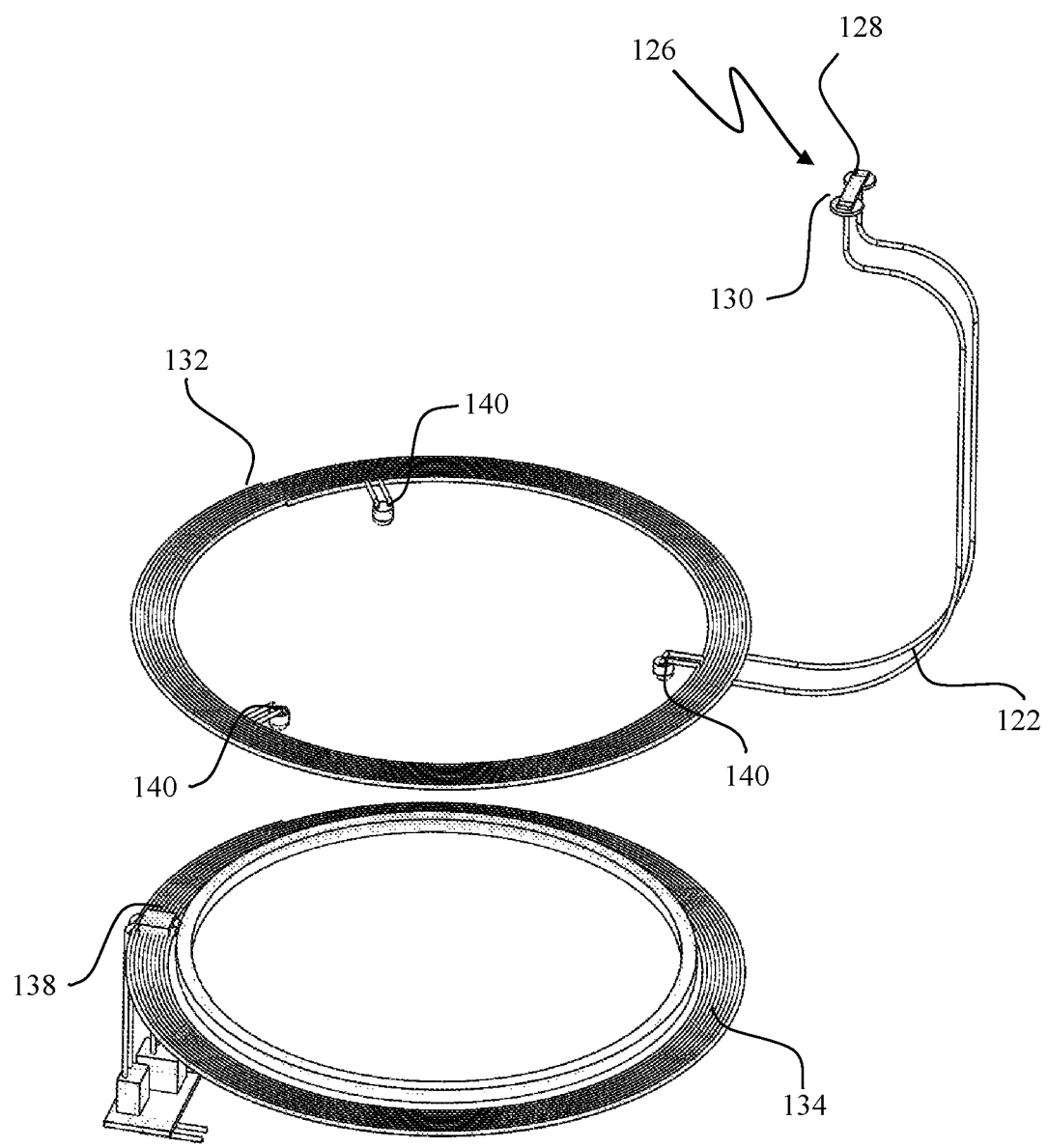
FIG. 4 is a cut-away perspective view of the kitchen device of FIG. 1.
Figure 7:
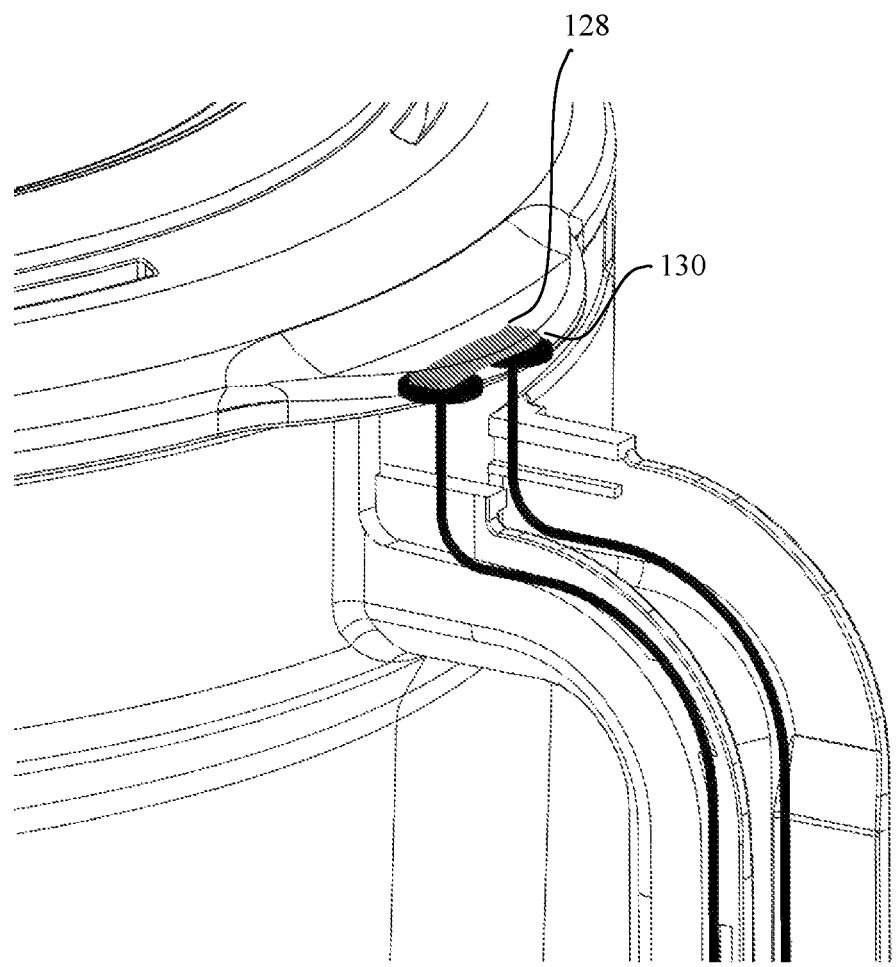
FIG. 7 is a detailed cut-away perspective view of the vessel of FIG. 6.

As can be seen in FIG. 4, the first interlock circuit 122 includes a first coupling 126 to provide for completion of the first interlock circuit 122. As shown in FIG. 7, the first coupling 126 includes a first portion 128 mounted to the lid 106 and a second portion 130 mounted to the vessel 104 adjacent the rim 112. In one embodiment, the first portion 128 of the first coupling 126 may be a conductive pad, for example manufactured from metal, attached to the rim 112. The second portion 130 of the first coupling 126 may be a pair of contact points formed on the lid base 107 in a location such that, when the lid 106 is mounted on the vessel 104, the first portion 128 will come into contact with the second portion 130 thereby completing the first interlock circuit 122.

Figure 5:
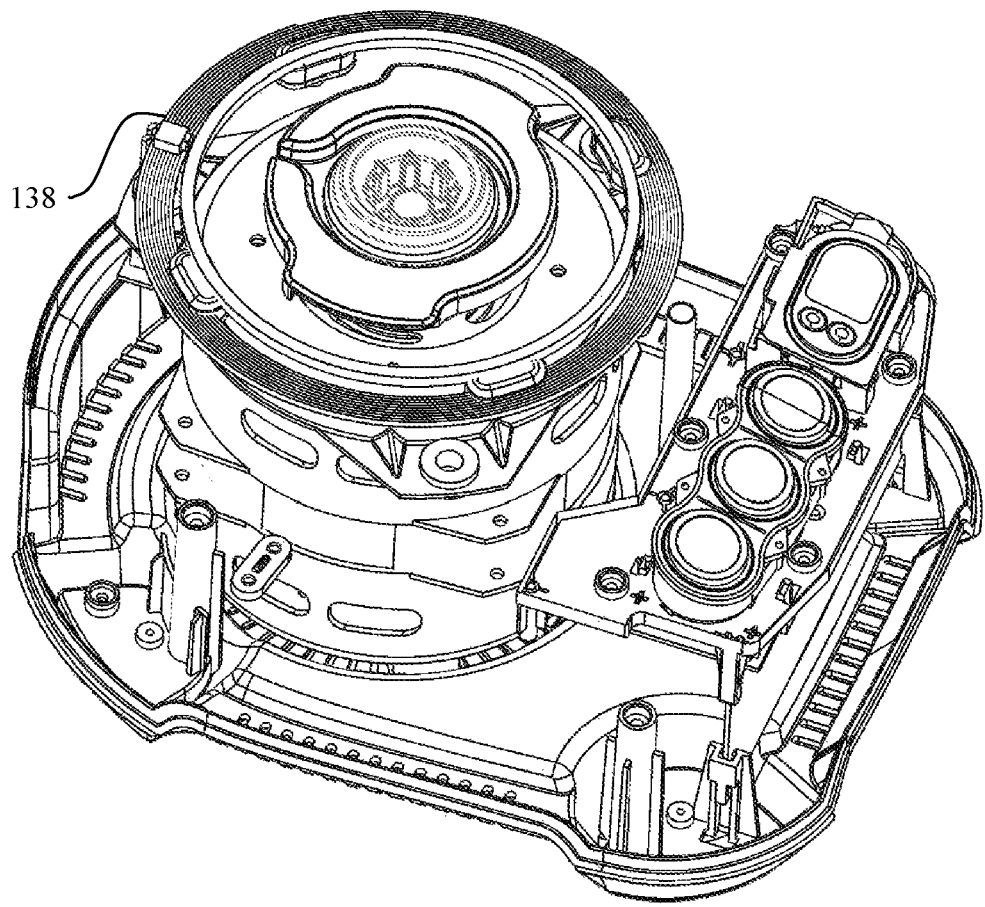
FIG. 5 is a cut-away perspective view of a base of the kitchen device of FIG. 1.
Figure 6:
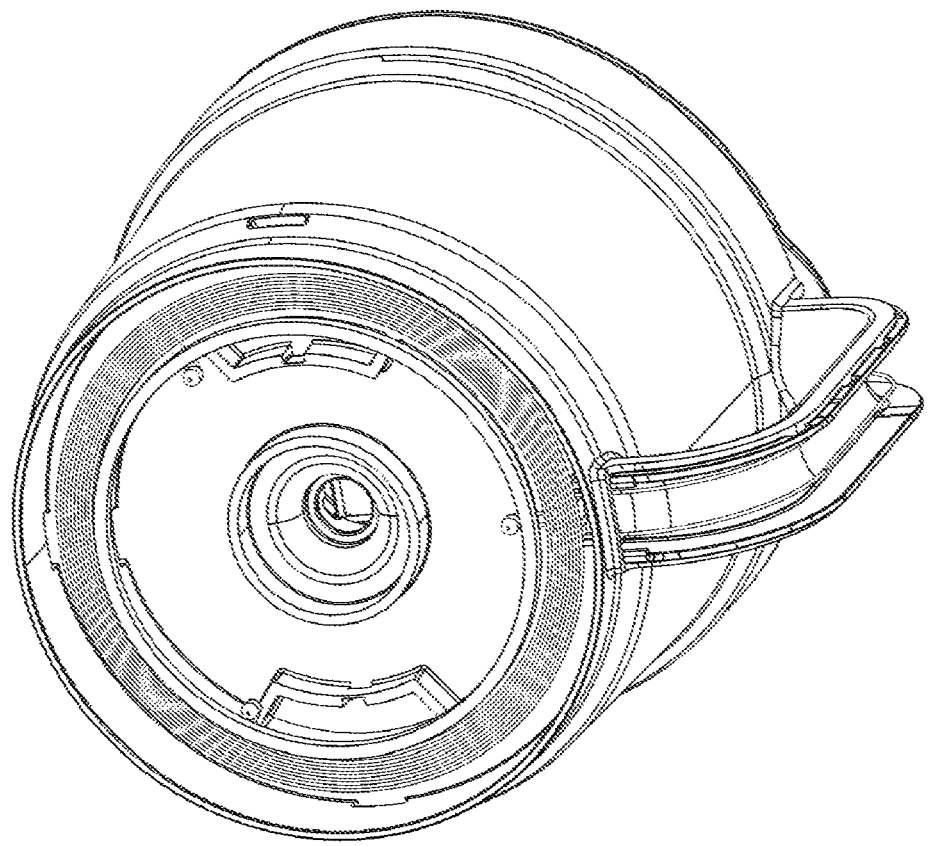
FIG. 6 is a cut-away perspective view of a vessel of the kitchen device of FIG. 1.

The first interlock circuit 122 further includes a receiver coil 132 mounted in the vessel 104 and shown in FIG. 6. The receiver coil 132 is configured to receive electrical power from a transmitter coil 134 included in the base 102 and shown in FIG. 5. Both the receiver coil 132 and the transmitter coil 134 are mounted in a waterproof manner.

Figure 8:
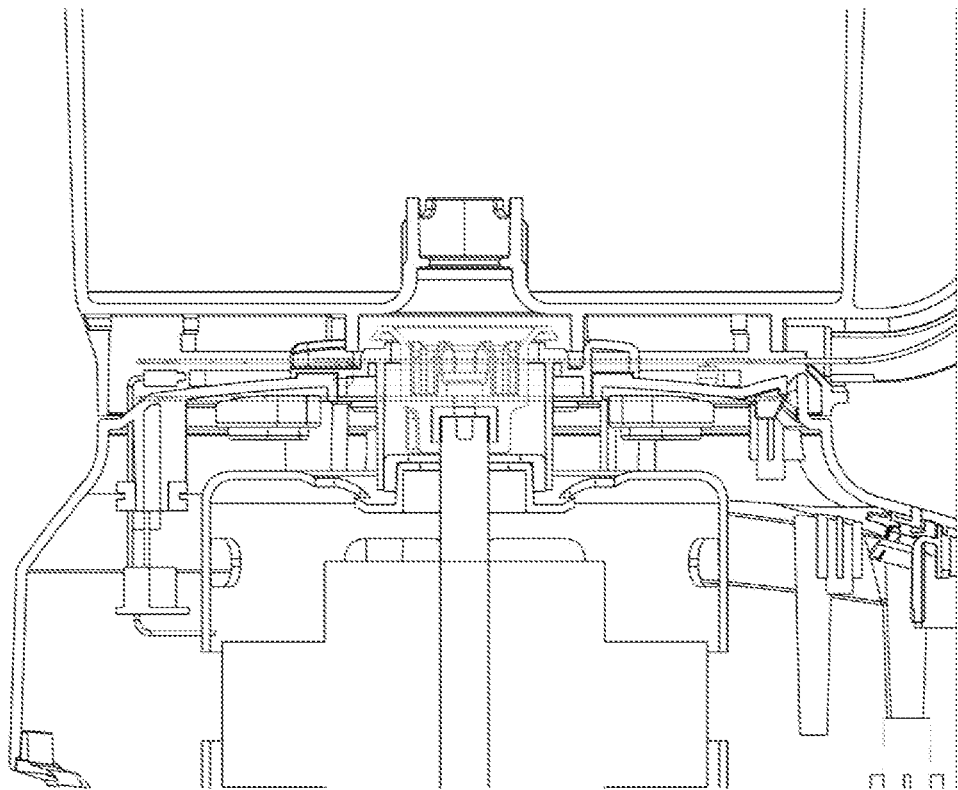
FIG. 8 is a detailed right section view of the kitchen device of FIG. 1.
Figure 9:
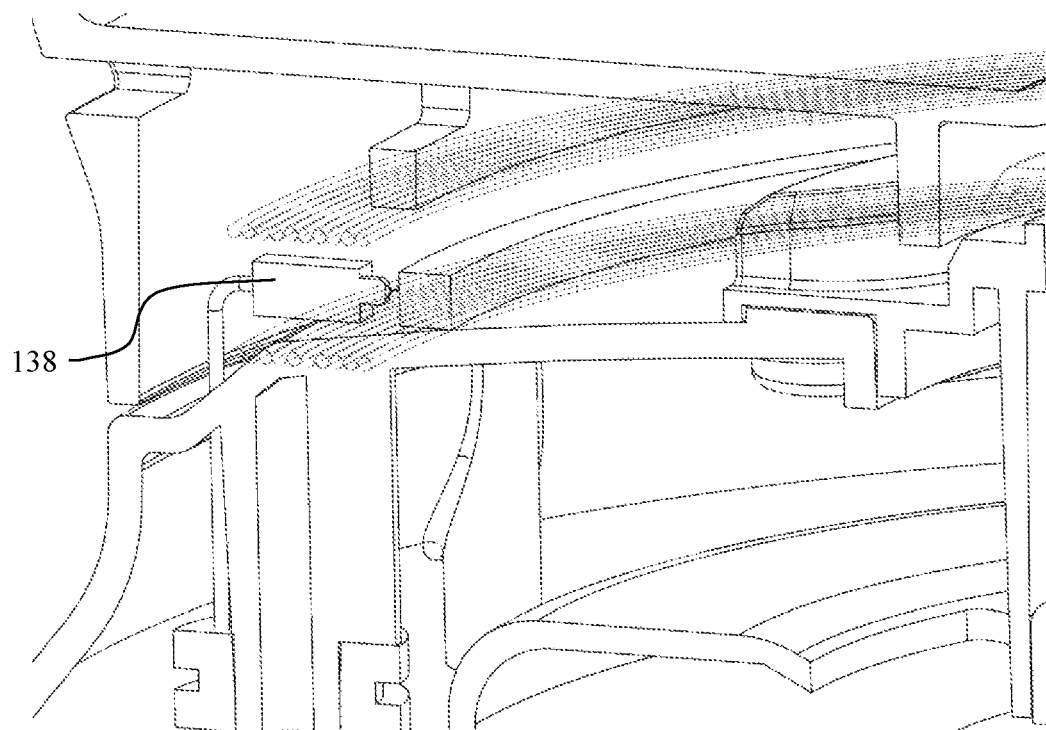
FIG. 9 is a detailed cut-away perspective view of the kitchen device of FIG. 1.
Figure 10:
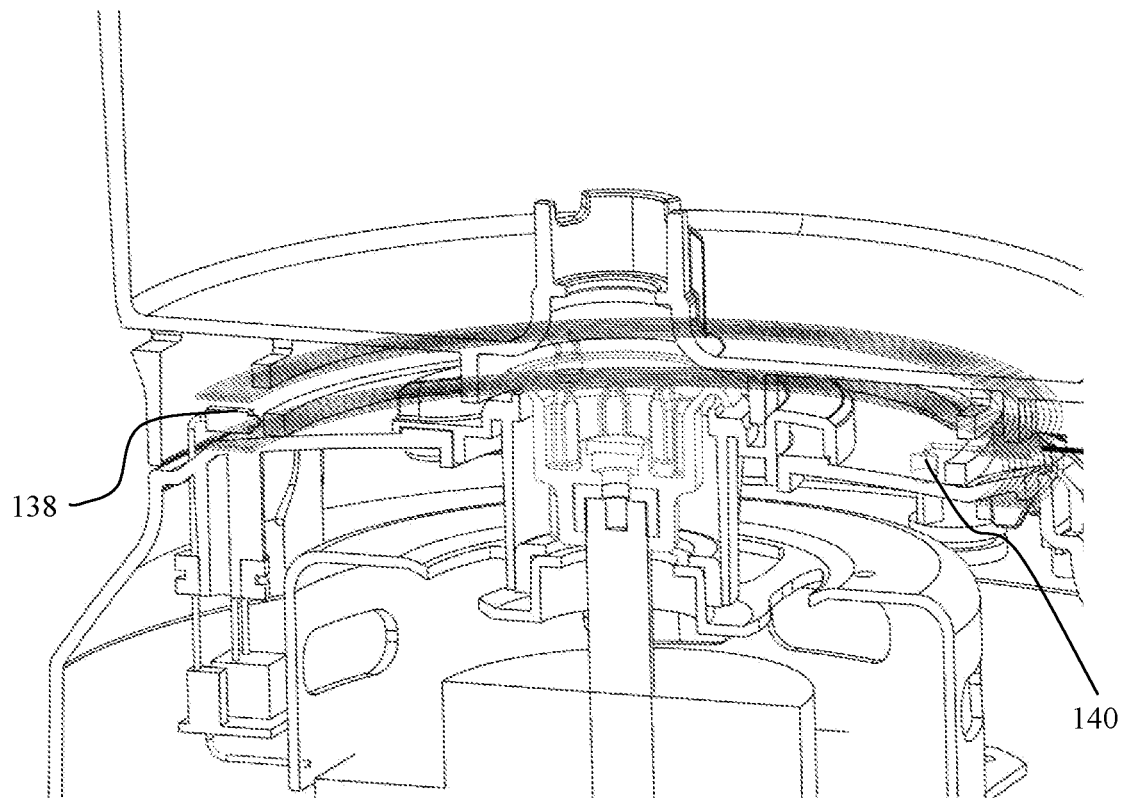
FIG. 10 is a detailed cut-away perspective view of the kitchen device of FIG. 1.
Figure 11:
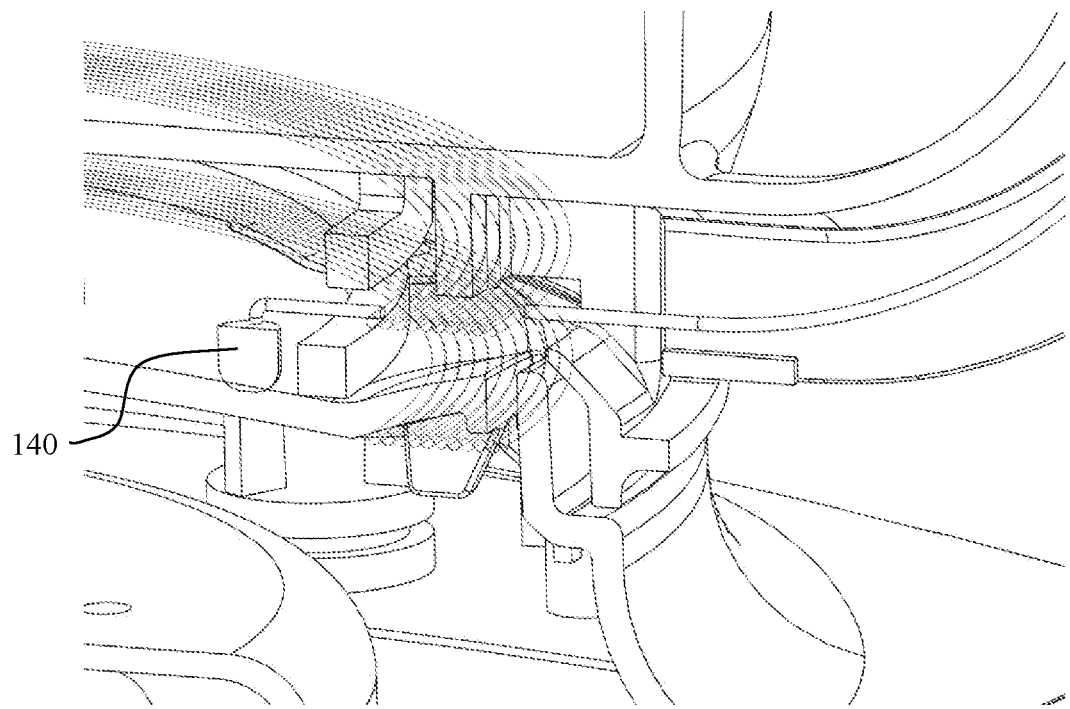
FIG. 11 is a detailed cut-away perspective view of the kitchen device of FIG. 1.
Figure 13:
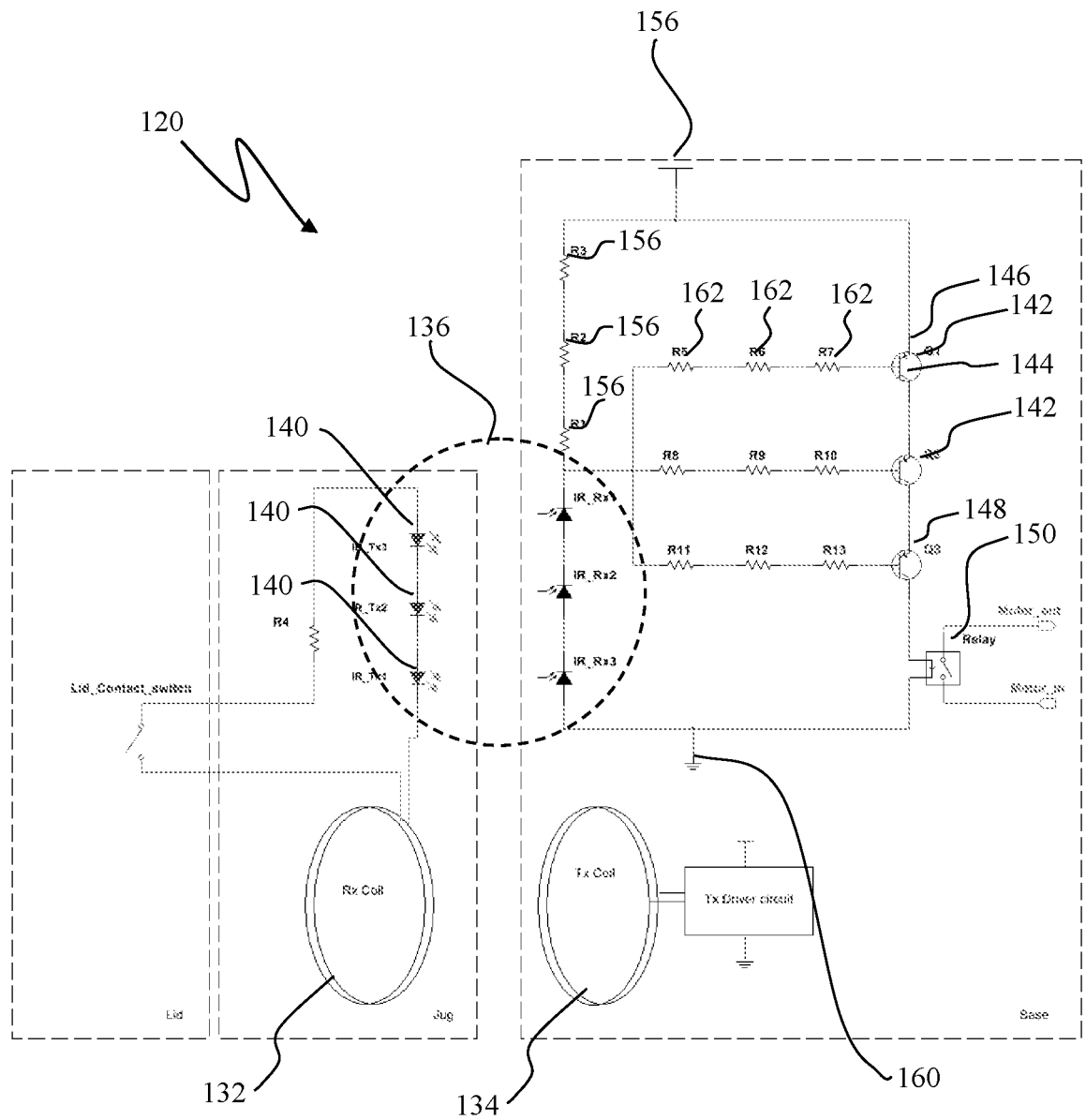
FIG. 13 is a schematic circuit diagram of a second embodiment of an interlock circuit of the kitchen device of FIG. 1.
Figure 14:
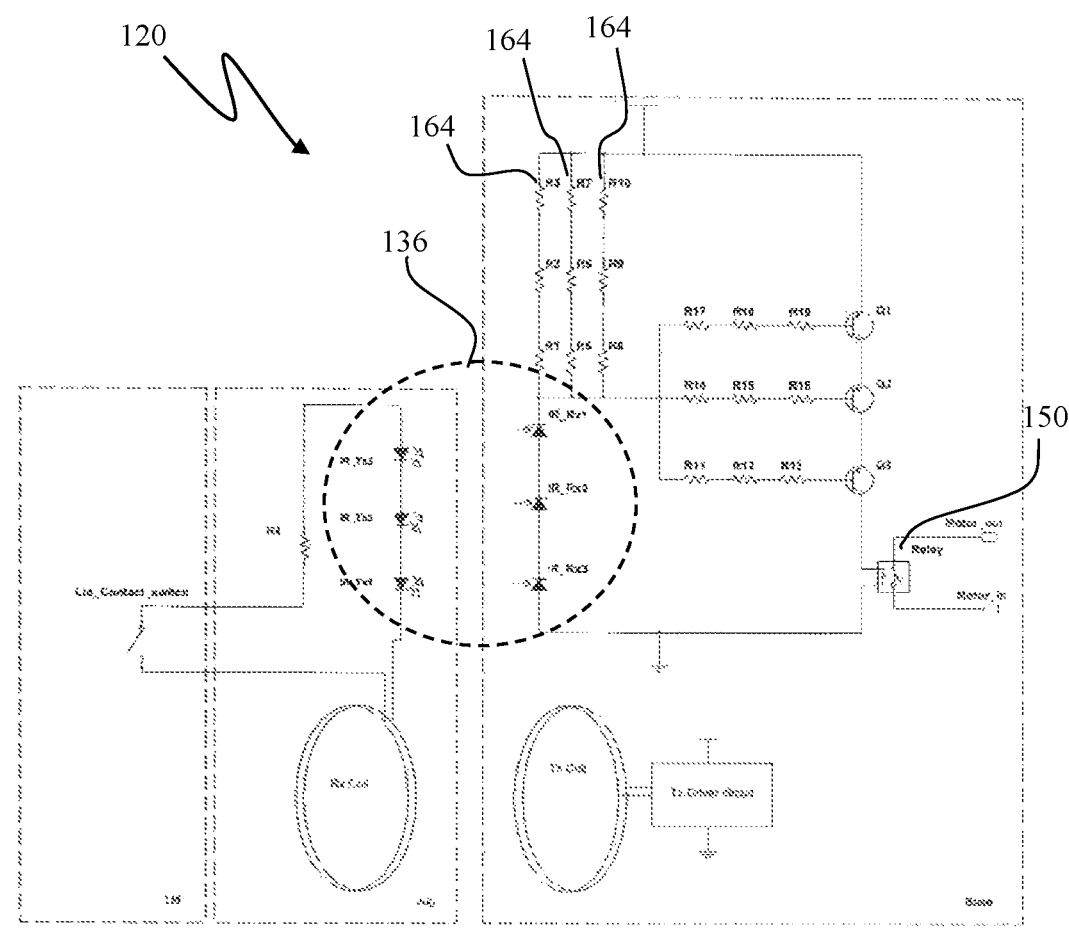
FIG. 14 is a schematic circuit diagram of a third embodiment of an interlock circuit of the kitchen device of FIG. 1.

The second interlock circuit 124 includes a second coupling 136 to activate the second interlock circuit 124, as schematically shown in FIG. 12. The second coupling 136 includes a first portion 138 that is part of the second interlock circuit 124 and mounted to the base 102. The first portion 138 is operatively associated with a second portion 140 that is mounted to the vessel 104 and part of the first interlock circuit 122 to send a non-contact output from the second portion 140 to the first portion 138 and activate the second interlock circuit 124. In a preferred embodiment shown in FIGS. 8 and 10, the first portion 138 is an infrared (IR) sensitive photodiode, best seen in FIG. 9, and the second portion 140 is an infrared (IR) light emitting diode (LED), best seen in FIG. 11. Both the first portion 138 and the second portion 140 are shown in FIG. 10. In another embodiment, the first portion 138 is a radio-frequency (RF) receiver and the second portion 140 is a radio-frequency (RF) transmitter. In another embodiment the LED 140 emits light in the visible light spectrum and the photodiode 138 is correspondingly sensitive to light in the visible spectrum. In yet another embodiment, for example as shown in FIGS. 13 and 14, there is a plurality of first portions 138 and a plurality of second portions 140. Each and any second portion 140 is adapted to operate each and any first portion 138.

In any embodiment the first and second portions 138, 140 are mounted in a waterproof manner.

As shown in FIG. 12, the second interlock circuit 124 further includes a plurality of transistors 142, in the embodiment where the second portion 140 is an IR light emitting diode (LED), preferably PNP-type transistors, electrically connected in series from collector 144 to emitter 146. The last transistor 148 in the series is connected to a relay 150. The relay 150 is configured to permit the delivery of the electrical power to the mechanism 118 upon closure of the relay contacts, i.e. when operated or activated by the plurality of transistors 142. Throughout the specification the term "electrical connection" does not necessarily define a direct connection, but can also refer to an indirect connection, e.g. with a further electrical component, such as a resistor, located between the two points being connected.

Each transistor 142 has a base line 152 electrically connects a base of the transistor 142 to a cathode 154 of the IR sensitive photodiode. The cathode 154 is also connected to a positive voltage source 156 (i.e. a source of electrical power), while an anode 158 of the IR sensitive photodiode is connected to a ground contact 160. Each base line 152 is connected to a resistor 162 as seen in FIG. 12, or a plurality of resistors 162 connected in series as seen in FIG. 13. Similarly, the connection between the cathode 154 and the positive voltage source 156 also has a resistor 164, as seen in FIG. 12, or a plurality of resistors 164 connected in series, as seen in FIG. 13. Each of the plurality of resistors 162, 164 may include resistors connected in series and/or parallel, as seen in FIG. 14.

The kitchen device 100 may further include a sensor (not shown) mounted to the base 102 of the vessel 104, the sensor being configured to determine whether the vessel 104 is received on the base 102 and upon that determination the sensor is configured to send an indication that the vessel 104 is received on the base 102. The kitchen device 100 may yet further include a processor (not shown) located in the base 102. The processor is configured to receive the indication that the vessel 104 is received on the base 102 from the sensor. The processor is also configured to prevent delivery of the electric power to the mechanism 118 when the processor has not received the indication that the vessel 104 is received on the base 102 from the sensor. In a preferred embodiment the sensor is a load cell, in another preferred embodiment the sensor is a temperature sensor, in yet another preferred embodiment the sensor is a proximity sensor.

FIGS. 15 to 18 show a second embodiment of a kitchen device 100. The kitchen device 100 shown in FIGS. 15 to 18 is substantially the same as that shown in FIGS. 1 to 14, except for the following features.

Figure 15:
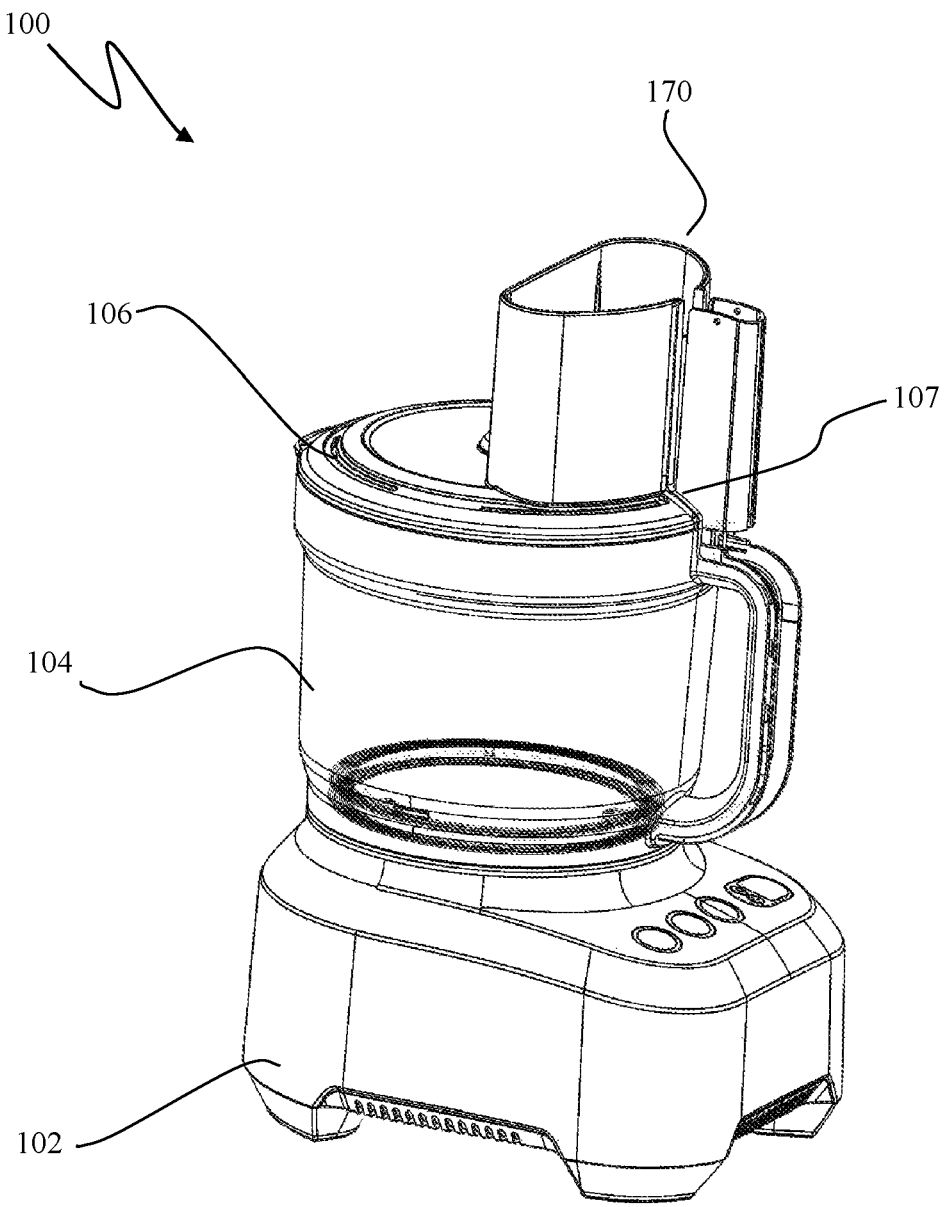
FIG. 15 is a perspective view of a kitchen device according to a second embodiment of the invention.
Figure 16:
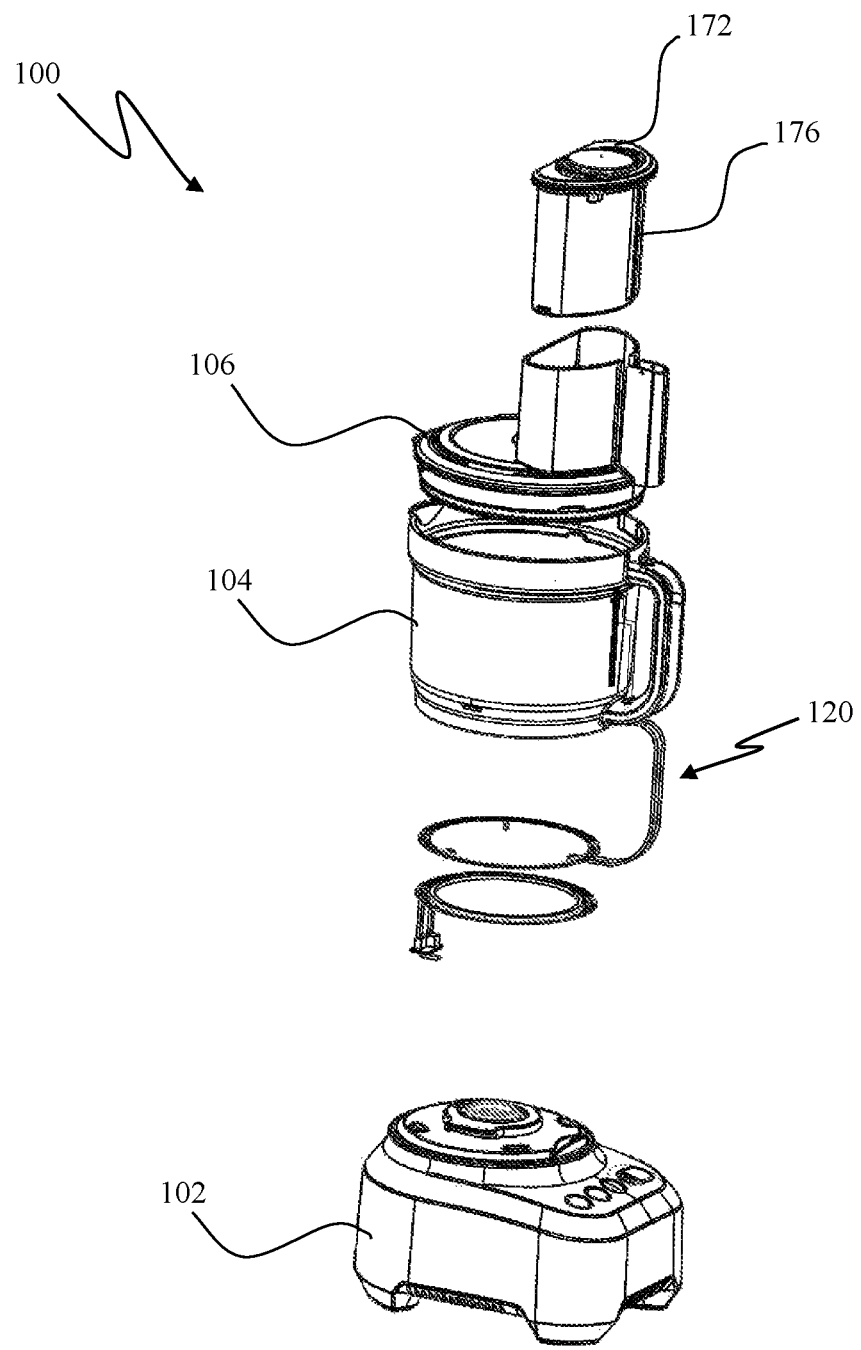
FIG. 16 is an exploded perspective view of the kitchen device of FIG. 15.
Figure 17:
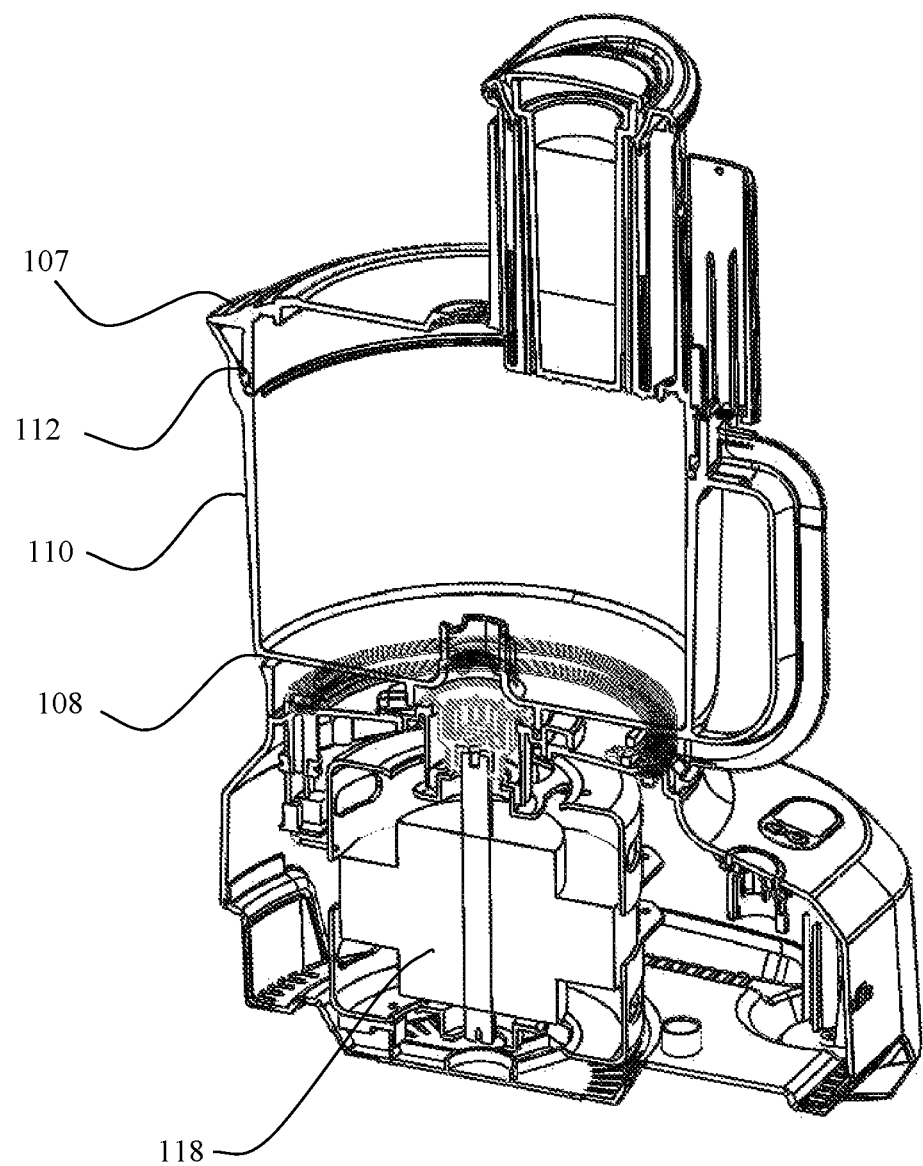
FIG. 17 is a perspective section view of the kitchen device of FIG. 15.
Figure 18:
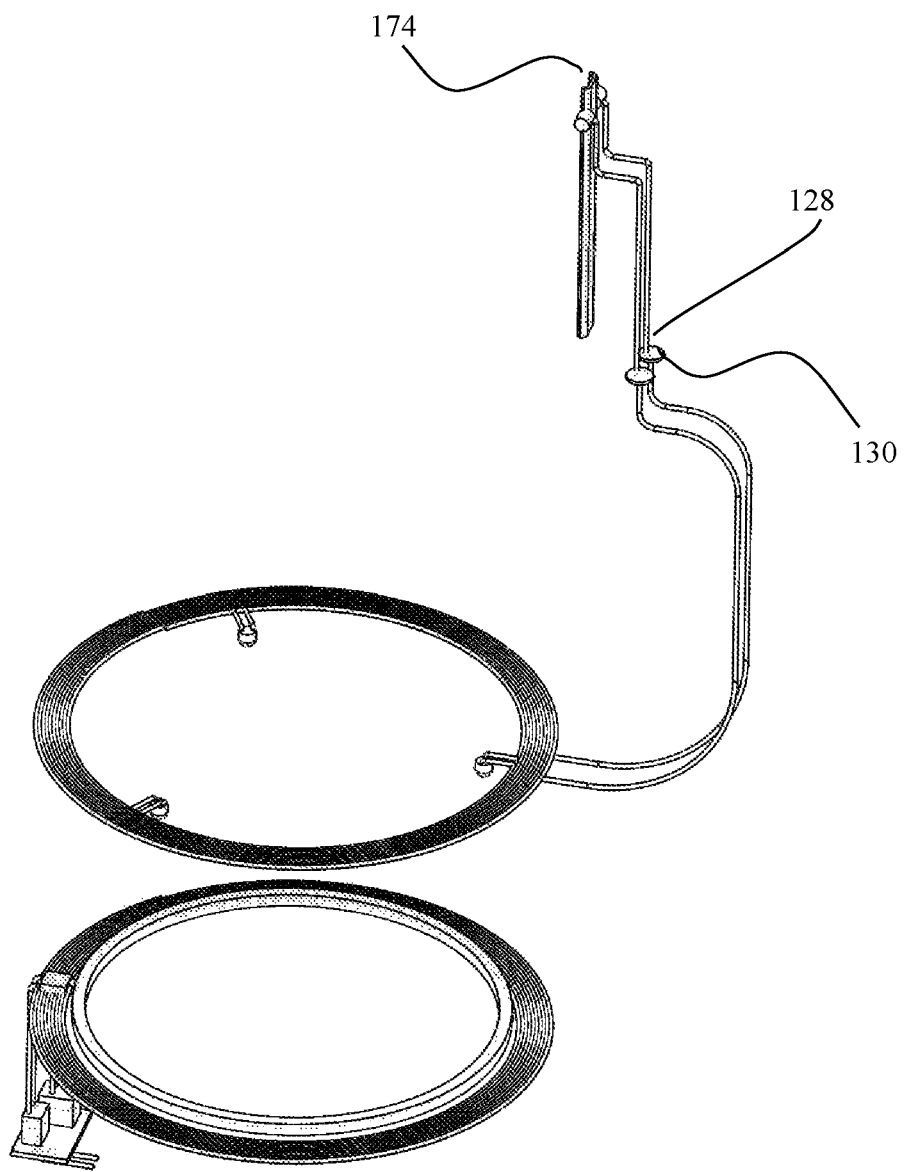
FIG. 18 is a cut-away perspective view of the kitchen device of FIG. 15.

As shown in FIG. 15, the lid 106 includes a feed tube 170 extending from the lid base 107 and communicating with the space 114 to deliver food to the space 114 through the feed tube 170. As shown in FIG. 16, the lid 106 also includes a pusher member 172 slidably received in the feed tube 170 to move the food along the feed tube 172 to the space 114. In this embodiment, the first portion 128 and the second portion 130 are electrical contacts on the lid base 107 and the vessel 104 respectively, as shown in FIG. 18. As also shown in FIG. 18, in this embodiment the first coupling 126 further includes a third portion 174 associated with the feed tube 170, and a fourth portion 176 associated with the pusher member 172. In this embodiment, the third portion 174 is a set of conductive contact tracks and the fourth portion 176 is a conductive pad.

Figure 23:
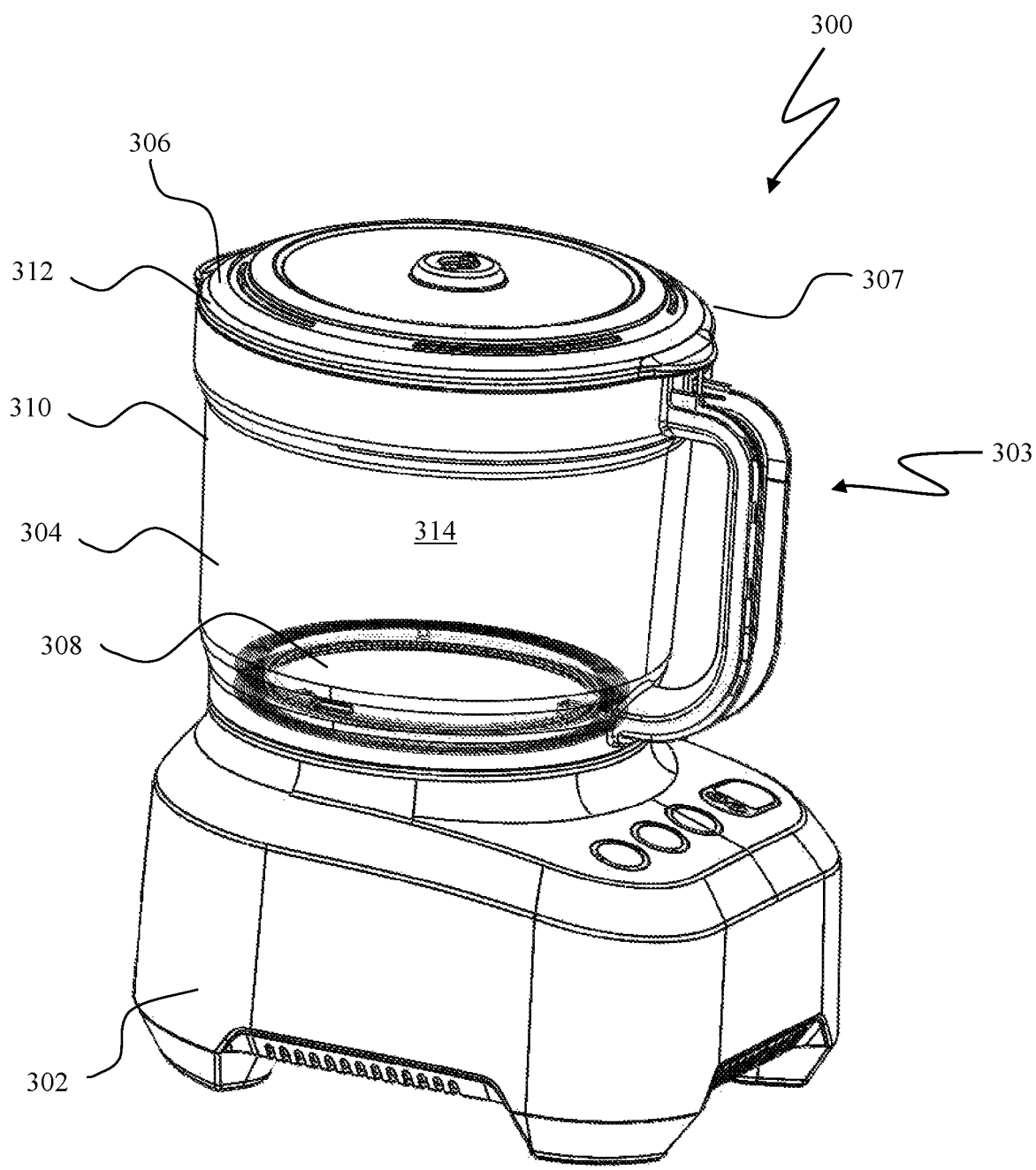
FIG. 23 is a perspective view of a kitchen device according to a further embodiment of the present invention.
Figure 24:
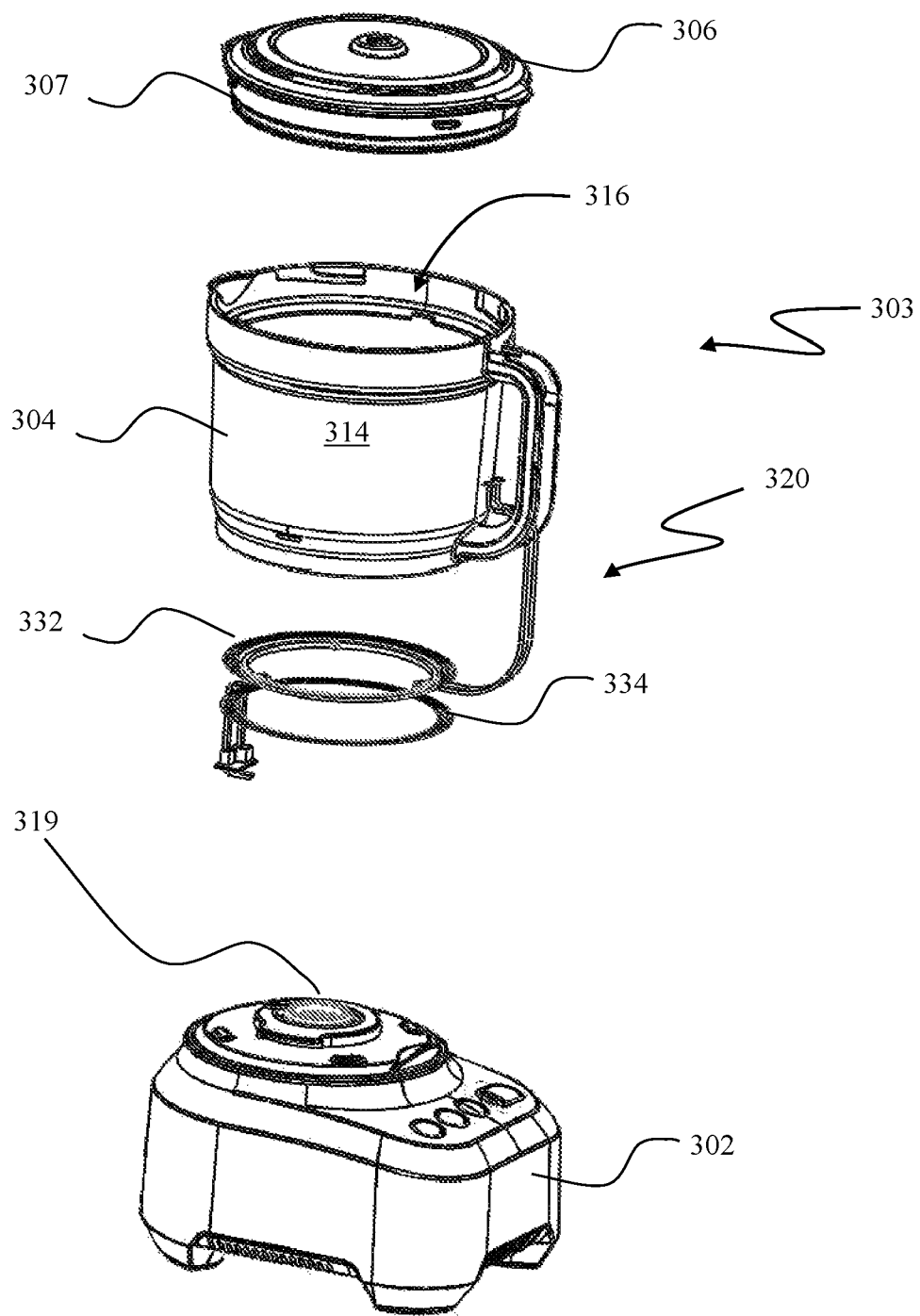
FIG. 24 is an exploded perspective view of the kitchen device of FIG. 23.
Figure 25:
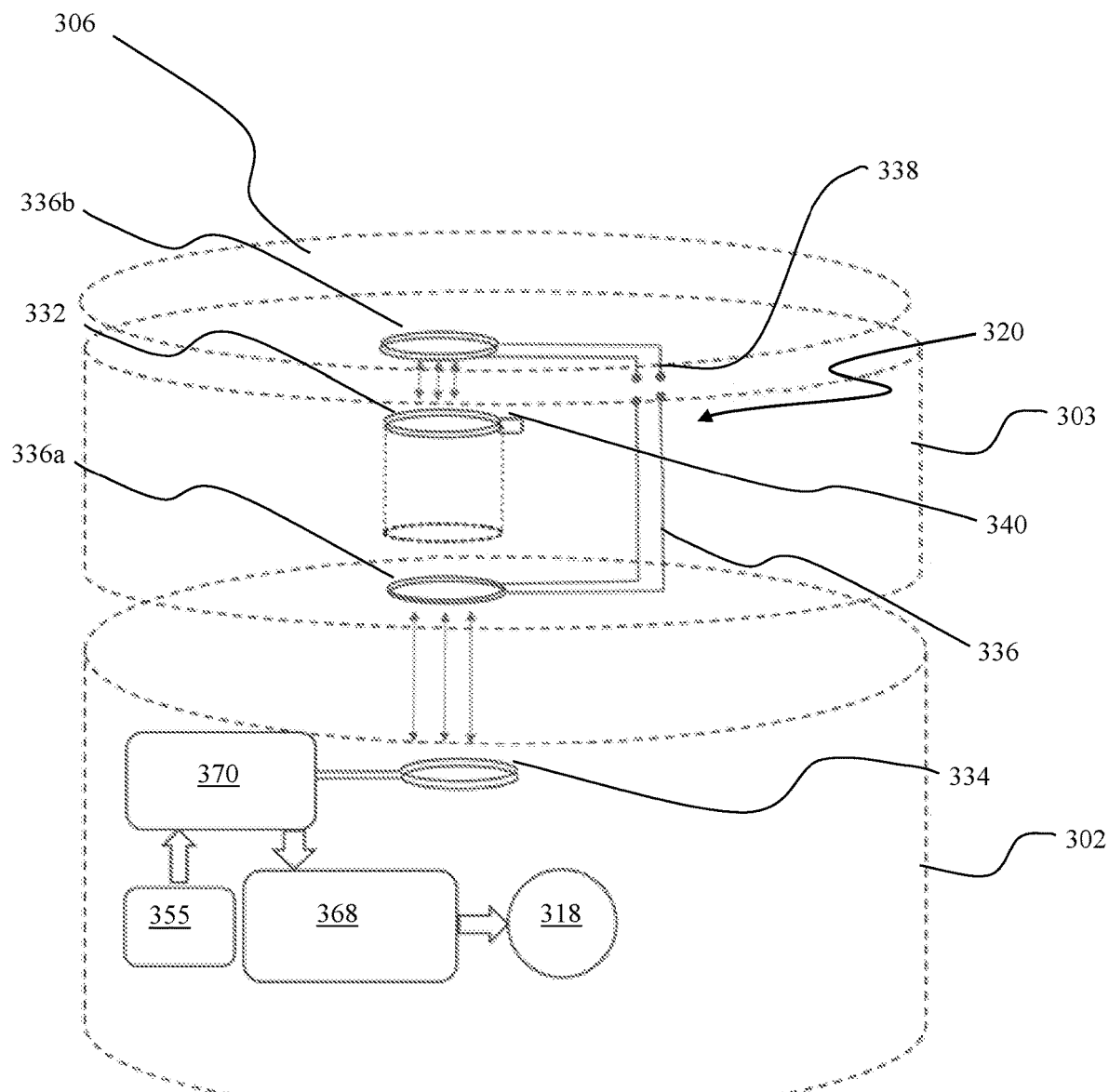
FIG. 25 is a schematic system diagram of the kitchen device of FIG. 23.

FIGS. 23 to 25 show a kitchen device 300 according to a further embodiment of the present invention. The kitchen device 300 includes a base 302 and an accessory 303 removable connected to the base 302. The accessory 303 includes a vessel 304, and a lid 306. As seen in FIG. 23, the vessel 304 includes a bottom wall 308, a side wall 310 extending upwardly from the bottom wall 308 to a rim 312 so as to provide a space 314 to receive the food to be processed. The rim 312 surrounds an opening 316 to the space 314. The lid 306 has a lid base 307 and is removably coupled to the rim 312 with the lid base 307 so as to close the opening 316.

As seen in FIG. 25, the base 302 houses a mechanism 318 that is operated using electrical power to cause processing of food contained in the space 314. The mechanism 318 may be a motor 318, for example. The motor 318 may be coupled to a motor shaft 319 so that the accessory 303 is operable by the motor 318 when the accessory 303 is connected to the base 302. In an alternative embodiment, the mechanism 318 may be a heating element 318 for providing heat to the food to be processed. The heating element, or heater 318, is preferably located in the base 302, such that the heater 318 is in thermal communication with the accessory 303, when the accessory 303 is connected to the base 302, if the accessory requires heating. Other embodiments may include both a motor 318 and a heating element 318. The motor 318 is controlled by a microprocessor 368 according to a motor control profile. The motor control profile may include, for example, a constant motor speed, a sequence of different motor speeds for predetermined periods of time, or motor speed of zero, being a safety lock on the motor. The heater 318 is also controlled by a microprocessor 368 according to a heater control profile. The heater control profile may include, for example, a constant temperature or power output, a sequence of different temperatures or power outputs for predetermined periods of time, or power output of zero, being a safety lock on the heater.

As shown in FIG. 25, the base 302 includes a base electromagnetic coil 334 to receive electrical power from a mains power source 355, and controlled by the microprocessor 368 that is also located in the base 302. Similarly, the accessory 303 includes a transmission circuit 320 that includes an accessory electromagnetic coil 332. The base and accessory electromagnetic coils 332, 334 are adapted to communicate with each other, for example by inducing electric current or electric potential in each other. The transmission circuit 320 is also adapted to produce an accessory identification signal when the base electromagnetic coil 334 is controlled by the interactions with the accessory electromagnetic coil 332 appropriately, for example using radiofrequency identification (RFID) technology. The accessory identification signal is indicative of a type of the accessory 303, that is, whether the accessory 303 is, for example, a food processor, a blender, a juicer, etc. The microprocessor 386 is configured to determine the motor and/or heater control profile as a function of the accessory identification signal. For example, when the accessory 303 is a food processor, the microprocessor 386 may impose a speed limit on the motor 318, and set the heater 318 to a zero power output. Of course, many types of accessories are envisioned, such as blades, whisks, lids, etc.

The accessory 303, as shown in FIG. 25, further includes a relay electromagnetic coil 336. Although the embodiment shown in FIG. 25 has a relay electromagnetic coil 336, other embodiments are contemplated where the relay electromagnetic coil 336 is not necessary. For example, if the accessory electromagnetic coil 332 were located in the position presently occupied by a lower portion 336a of the relay electromagnetic coil 336, the base electromagnetic coil 334 could interact directly with the accessory electromagnetic coil 332, obviating the need for the relay electromagnetic coil 336.

However, in the embodiment shown in FIG. 25, the accessory electromagnetic coil 332 is located at an end of the accessory 303 that is away from the base 302. Thus, the relay electromagnetic coil 336 is used to interact, at a lower portion 336a with the base electromagnetic coil 334, and at an upper portion 336b, with the accessory electromagnetic coil 332, thereby allowing the base electromagnetic coil 334 to interact indirectly with the accessory electromagnetic coil 332 via the relay electromagnetic coil 336.

The kitchen device 300 may further include a sensor 340 located on the accessory 203 to provide a sensor signal to the transmission circuit 320. The sensor signal is sent by the transmission circuit 320 to the microprocessor 386. This occurs when the microprocessor 386 controls the base electromagnetic coil 334 to interact with the accessory electromagnetic coil 332, thereby receiving the sensor signal. In an embodiment, the accessory 303 has no independent internal power source, but receives electromagnetic energy by induction between the base electromagnetic coil 334 and the accessory electromagnetic coil 332. Thus, the range of sensors 340 that can be powered is limited by the amount of electromagnetic energy that can be safely induced. The sensor 340 may include at least one or more of a strain gauge, an accelerometer, a thermocouple, and/or a radiofrequency identification chip. In another embodiment, the accessory 303 has a battery (not shown) that may be charged wirelessly via the accessory electromagnetic coil 332 and the base electromagnetic coil 334. In this embodiment, the sensor 340 may have a higher power draw.

The microprocessor 386 is configured to control the motor control profile, or heater control profile, as a function of the sensor signal. For example, if the sensor 340 is a strain gauge located on the motor shaft 319, the sensor signal may be used by the microprocessor 386 to determine a torque on the motor shaft 319. The microprocessor 386 may limit the power applied to the motor 318 when the torque determined from the sensor signal exceeds a predetermined safety limit. Similarly, or alternatively, if the sensor 340 is a thermocouple, the sensor signal may be used by the microprocessor 386 to determine a temperature of the vessel 304, or the food contained in the space 314. The microprocessor 386 may alter the power applied to the heater 318 when the temperature determined from the sensor signal is outside a predetermined temperature range.

The accessory 303 further includes a safety device, in this embodiment the lid 306, movable to a safe configuration that improves safety of a user during operation of the accessory 303. The safe configuration, in the embodiment shown in FIGS. 23 to 25, is the lid 306 being placed on the vessel 304, thereby closing the opening 316 and preventing access to the space 314. The lid 306 interacts with the transmission circuit 320 to produce an interlock signal indicative of whether the lid 306 is in the safe configuration. In the embodiment of FIGS. 23 to 25, the upper portion 336b of the relay electromagnetic coil 336 is located in the lid 306. Thus, the base electromagnetic relay 334 is unable to interact with the accessory electromagnetic relay 332, unless the lid 306 is in the safe configuration. When the lid 306 is in the safe configuration, a coupling 338 connects the upper portion 336b of the relay electromagnetic coil 336 to the lower portion 336a, thereby enabling the base electromagnetic relay 334 to interact indirectly with the accessory electromagnetic relay 332 via the relay electromagnetic coil 336. Thus, in this embodiment, the receipt of the accessory identification signal by the microprocessor 386 is the interlock signal. The microprocessor 386 is configured to set the motor control profile as a function of the interlock signal, for example, the microprocessor 386 may set the motor speed to zero, while no interlock signal is received.

In other contemplated embodiments, for example when the accessory 303 is a food processor with a lid 306 having a chute (not shown) and a pusher (not shown), the accessory 303 can include a plurality of safety devices: the lid 306 and the pusher. Correspondingly, the transmission circuit 320 is configured to produce a respective interlock signal indicative of whether each safety device 306 is in the respective safe configuration.

Figure 26:
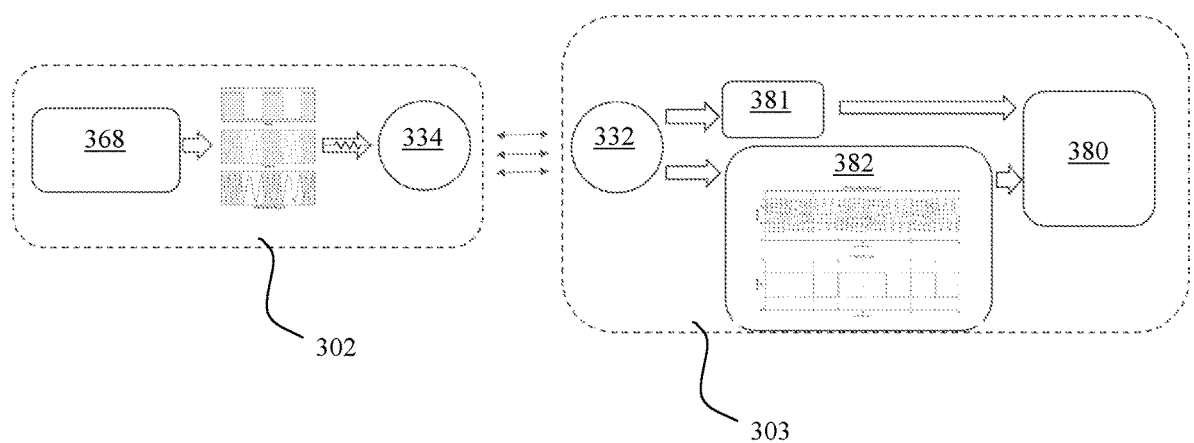
FIG. 26 is a further schematic system diagram of the kitchen device of FIG. 23.
Figure 27:
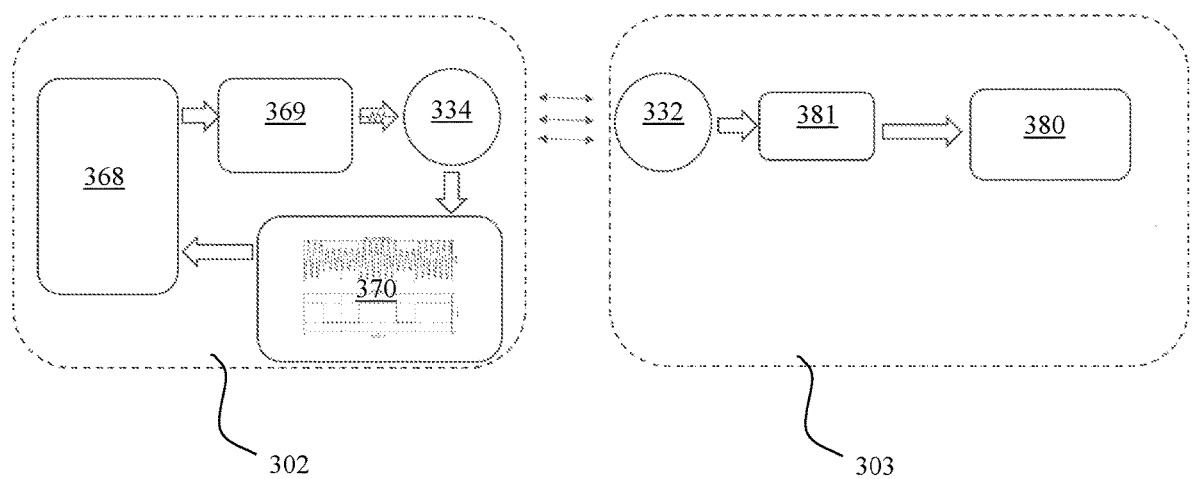
FIG. 27 is a further schematic system diagram of the kitchen device of FIG. 23.

The transmission circuit 320 may further include, as shown in FIG. 26, an accessory microprocessor 380 to receive and send signals from and to the accessory electromagnetic coil 332. The transmission circuit 320 may further include a regulator 381 to provide a source of DC power to the accessory microprocessor 380, as well as a frequency shift keying (FSK) filter 382 to decode FSK-encoded information to be received by the accessory microprocessor 380. Finally, the base 302 may further include a carrier frequency generator 369 operatively connected to the microprocessor 386 and the base electromagnetic coil 334, to generate a base carrier frequency for the signals to be transmitted. The base 302 may further include an amplitude shift keying (ASK) filter 370 to decode ASK encoded information to be received by the microprocessor 386.

Use of the kitchen device 100 will now be discussed.

Food to be processed is placed via the opening 116 into the space 114. The lid 106 is placed atop the vessel 104, coupling the lid base 107 to the rim 112. This action completes the first coupling 126, which in the first embodiment complete the first interlock circuit 122. In the second embodiment, this action connects the conductive contact tracks to the first interlock circuit 122. In the second embodiment, the pusher member 172 is placed inside the feed tube 170. This action then completes the first interlock circuit 122 by coupling of the first and second portions 128, 130, and third and fourth portions 174, 176, respectively.

The vessel 104 is placed onto and received by the base 102 thereby aligning the receiver coil 132 and the transmitter coil 134. The transmitter coil 134 is connected to a source of electrical power. The electrical power is transmitted from the transmitter coil 134 to the receiver coil 132. If the actions above have been performed, the first interlock circuit 122 is completed and energised. The completion of the energised first interlock circuit 122 operates the IR LED 140. If the vessel 104 is positioned correctly on the base 102, the infrared light emitted by the IR LED 140 is received by the IR sensitive photodiode 138 and causes a current $I_1$ to flow from the cathode 154 to the anode 158, thereby activating the second interlock circuit 124. The current $I_1$ draws a current $I_2$ on the base line 152 of each transistor 142 thereby causing a large current $I_3$ to flow through the series of transistors 142 and the relay 150. The flow of the current $I_3$ through the relay 150 causes the relay 150 to permit the delivery of electrical power to the mechanism 118.

Advantages of the kitchen device 100 will now be discussed.

The design of the interlock circuits 122, 124 is such that no microprocessor is required to detect the presence of the vessel 104 on the base 102, and the presence of the lid 106 on the vessel 104 and permit the delivery of electrical power to the mechanism 118. This removes a source of possible failures as no software has to be produced, nor copied to a microprocessor, nor maintained on a microprocessor. This also simplifies the electrical certification process, particularly the failure mode assessments, of the interlock system 120.

The design of the interlock system 120 also has virtually no moving parts, as only the vessel 104, lid 106, and base 102 move in relation to each other. There are no switches or levers that are repeatedly moved. This removes a further source of possible mechanical and electrical failure.

Because all parts of the interlock system 120 that are mounted on or in the vessel 104 (i.e. the first interlock circuit 122 inclusive of the receiver coil 132, the first coupling 126 and the second portion 130) are mounted in a waterproof manner, the vessel 104 is dishwasher-proof and less likely to entrain pieces of food in difficult-to-clean spaces.

In embodiments having a plurality of first portions 138 and a plurality of second portions 140 the vessel 104 and the base 102 can tolerate a number of component failures in the receivers and/or transmitters, respectively, while still completing the first interlock circuit 122 and activating the second interlock circuit 124.

The arrangement of parallel base lines (control lines) 152 and/or parallel power supply lines including resistors 164 in one or more embodiments provides additional redundancy reducing the risk of complete failure of the device should a component (e.g. a transistor 142 or resistor 162, 164) fail in either open or short circuit.

Some of the advantages are minimizing the complexity and moving parts in the design. Also, this method avoids dependence of the software control but purely depend on electronic hardware which will simplify the electrical safety compliance requirements and avoid complex software assessments.

Figure 19:
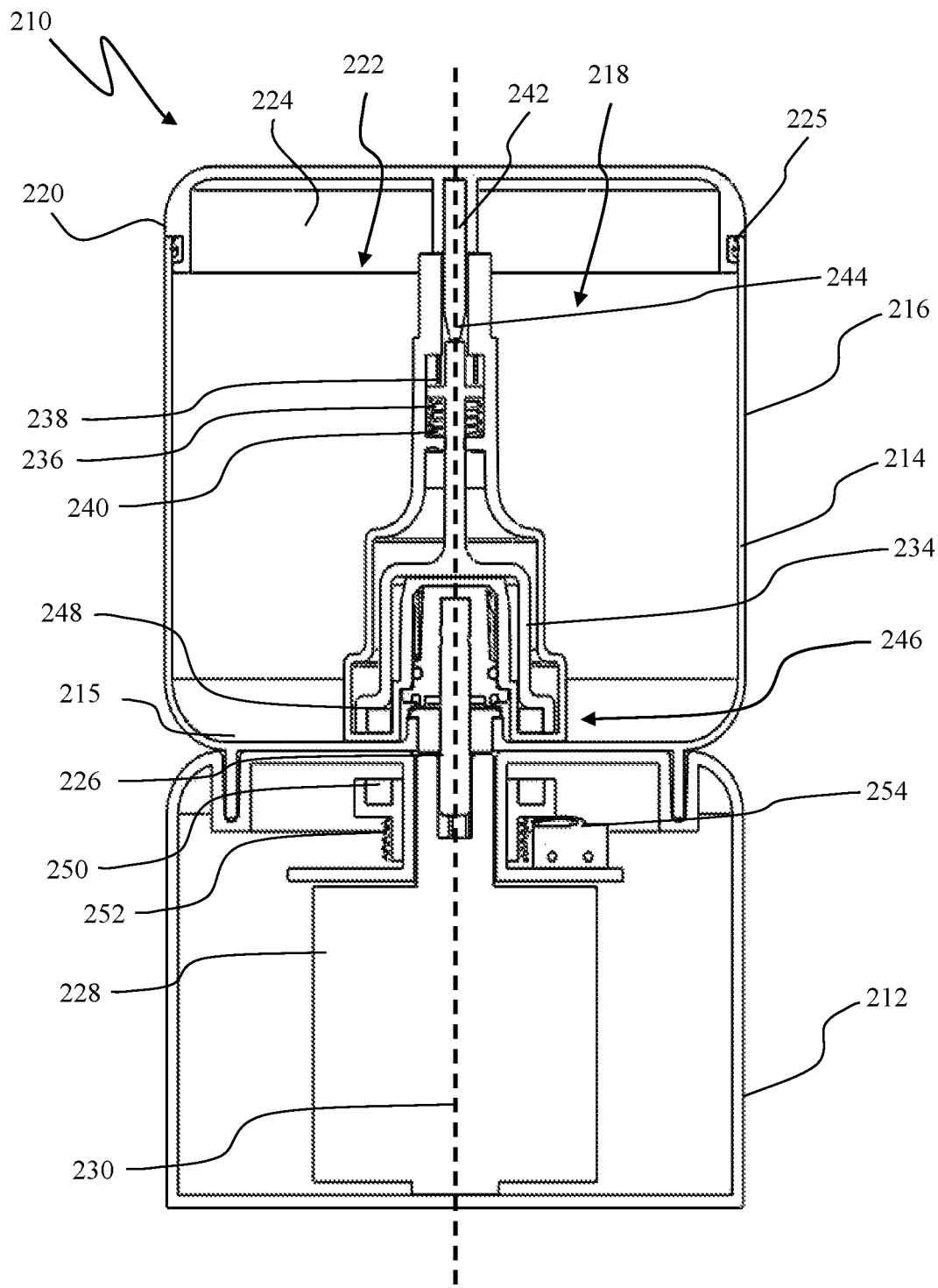
FIG. 19 is a schematic front section view of a kitchen device according to a second embodiment of the invention.

As seen in FIG. 19, a kitchen device 210 according to a second embodiment includes a base 212 and a vessel 214 received on the base 212. The vessel 214 has a bottom wall 215 and a sidewall 216 extending upwardly therefrom. The bottom wall 215 and sidewall 216 define a space 218 to receive ingredients (not shown). The sidewall 216 extends upwardly to a rim 220, the rim 220 defining an opening 222 to the space 218.

The kitchen device 210 also includes a lid 224 configured to be received on the rim 220 to close the opening 222. In this embodiment, the lid 224 is retained on the rim 220 by a threaded joint 225. However, other retention methods such as hinged lids, press fit lids, or bayonet lids are also possible. The kitchen device 210 further includes a shaft 226 extending through the bottom wall 215 into the space 218 for driving an agitator (not shown). However, in another embodiment the vessel 214 could be received on the base 212 with the opening 222 facing the base 212. In this embodiment, the shaft 226 extends through the opening 222 into the space 218. The kitchen device 210 further includes a motor 228 coupled to the shaft 226 to drive the shaft 226 about an axis 230.

Figure 22:
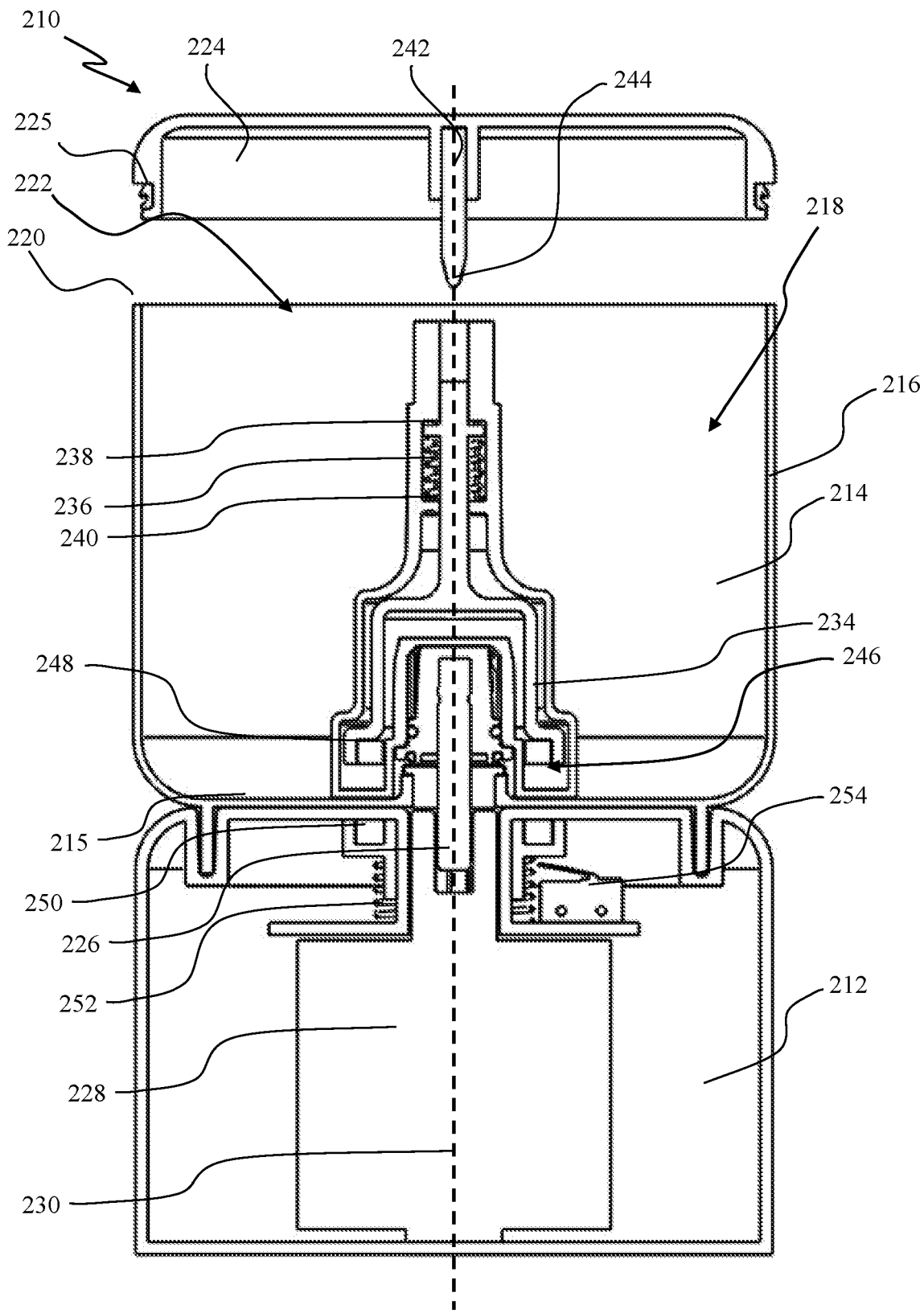
FIG. 22 is a schematic front section view of the kitchen device of FIG. 19 in a second configuration.

Yet further, the kitchen device 210 further includes a translating member 234 movably received by the shaft 226. In other contemplated embodiments the translating member 234 is only partly received by the shaft 226. The translating member 234 is movable between a first position shown in FIG. 22, and a second position shown in FIG. 19. As best seen in FIG. 22, the translating member 234 is biased towards the first position by a spring 236 that is compressed between an external flange 238 on the translating member 234 and an internal flange 240 on the shaft 226. Relatedly, the lid 224 includes an interlock portion, in this embodiment an interlock pin 242, located on the lid 224 such that, when the lid 224 is received on the rim 220, the interlock pin 242 is co-linear with the translating member 234. A bottom end 244 of the interlock pin 242 is located below a position the shaft 226 is urged to by the spring 236. Thus, the interlock pin 242 urges the translating member 234 downwards when the lid 224 is received on the rim 220. In a contemplated alternative embodiment, the interlock portion is a lid magnet located in the lid 224. The lid magnet cooperates with an upper magnet attached to the translating member 234 to move the translating member 234 to the second position as the lid 224 is secured to the rim 220.

Figure 20:
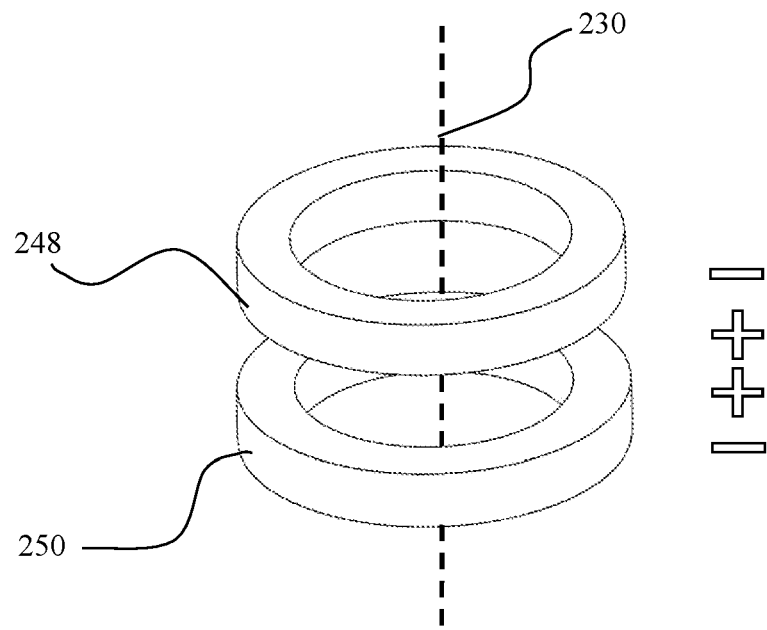
FIG. 20 is a detailed schematic perspective view of the kitchen device of FIG. 19.
Figure 21:
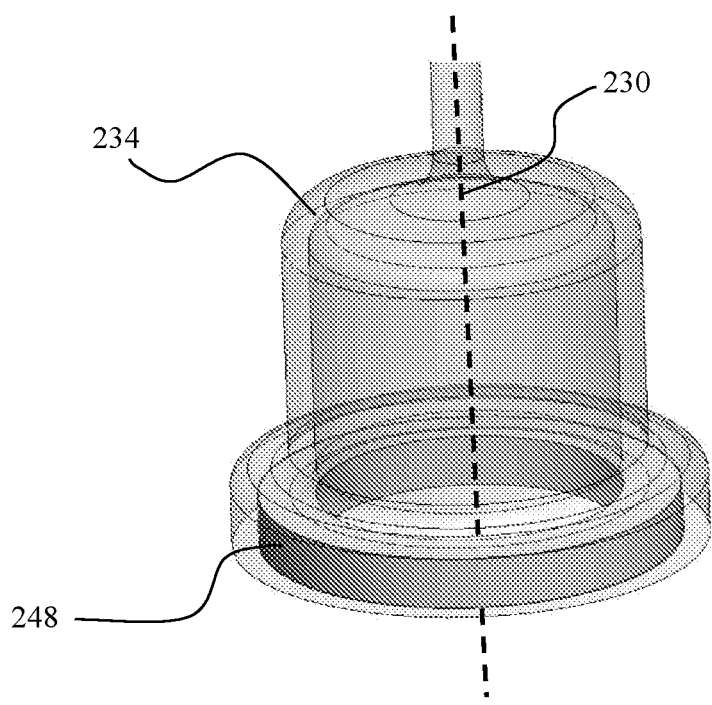
FIG. 21 is a detailed schematic perspective view of the kitchen device of FIG. 19.

As seen in FIG. 19, the kitchen device 210 further includes an interlock couple 246. The interlock couple 246 includes a first member, in this embodiment a first magnet 248, in the vessel 212 and attached to the translating member 234, and a second member, in this embodiment a second magnet 250, located in the base 212. As best seen in FIG. 20, the first and second magnets 248, 250 are ring-shaped and arranged concentrically about the axis 230. The first and second magnets 248, 250 are each movable between a first position shown in FIG. 22 and a second position shown in FIG. 19. The like poles of the first and second magnet 248, 250 are oriented facing towards each other such that the first magnet 248 repels the second magnet 250, and vice versa. Thus, movement of the translating member 234 caused by the interlock pin 242, and thereby movement of the first magnet 248 from the first position to the second position causes movement of the second magnet 250 from the first position to the second position. The second magnet 250 is biased upwardly towards the first position by a spring 252. However, the force provided by the spring 252 is less than the repelling force between the first and second magnets 248, 250 when the lid 226 is secured to the rim 220 so that the biasing force is overcome by the repelling force, causing the second magnet 250 to move to the second position.

In an alternative contemplated embodiment, the unlike poles of the first and second magnets 248, 250 are oriented facing towards each other such that the first magnet 248 attracts the second magnet 250 and vice versa. Thus, in this embodiment the first position of the second magnet 250 is the position shown in FIG. 19, while the second position of the second magnet 250 is the position shown in FIG. 22. The second magnet 250 remains biased towards the first position, for example by a spring or by its own weight. Similarly, due to the attraction between the first and second magnets 248, 250 movement of the first magnet 248 from the first position to the second position causes movement of the second magnet 250 from the first position to the second position. In a variation of this alternative embodiment, the second member is an unmagnetized steel plate instead of the second magnet 250.

The kitchen device 210 further includes an interlock sensor, in this embodiment a switch 254, configured to determine whether the second magnet 250 is in the second position. The switch 254 is mounted in the base 212 and located such that the switch 254 is closed by the second magnet 250, when the second magnet 250 is in the second position. The switch 254, when closed, provides power to the motor 228. Thus, when the second magnet 250 is in the first position, the motor 228 is unable to be operated. Alternatively, the switch 254, when closed, may send a signal to a processor (not shown) that controls operation of the motor 228. The processor prevents operation of the motor 228 unless it receives the signal.

In an alternative contemplated embodiment, the interlock sensor is an optocoupler (not shown) received in the base 212. In this embodiment, the optocoupler is positioned so that a light beam (not shown) is interrupted by the second magnet 250 when it is in the second position. In an alternative contemplated embodiment, the light beam is interrupted by a component (not shown) attached to the optocoupler. The optocoupler sends a signal to a processor when the light beam is interrupted.

In yet another alternative contemplated embodiment, the switch 254 is mounted in the base 212 and located such that the switch 254 is closed by the second magnet 250 when the second magnet 250 is in the first position.

Use of the kitchen device 210 will now be discussed.

To use the kitchen device 210, the vessel 214 is located on the base 212. So that the shaft 226 is engaged by the motor 228. Subsequently, the lid 224 is secured to the vessel 214 by screwing together the threaded joint 225. As the lid 224 is secured against the vessel 214, the interlock pin 242 depresses the translating member 234, thereby moving the first magnet 248 from the first position to the second position. As the first magnet 248 repels the second magnet 250, the second magnet 250 thus also moves from the first position to the second position. When the second magnet 250 is in the second position it closes the switch 254 thus providing power to the motor 228. The kitchen device 210 may now be used.

When operation of the kitchen device 210 is complete, the lid 224 is removed. Thus, the translating member 234, and the first magnet 248, returns to the first position due to the bias applied by the spring 236. The second magnet 250, no longer being repelled by the first magnet 248, also returns to the first position due to the bias applied by the spring 252, thereby opening the switch 254 and removing the power supply to the motor 228. Alternatively, the signal sent by the switch 254 is no longer received by the processor and the processor prevents operation of the motor 228.

In a contemplated embodiment, when the switch 254 is opened, a mechanical or electrically resistive brake is applied to the motor 228 to reduce the velocity of the shaft 226 in under 5 seconds, preferably under 4 seconds, even more preferably under 2 seconds.

Advantages of the kitchen device 210 will now be discussed.

Because the interlock assembly 234 proposed in the various embodiments above only resists the securement of the lid 226 by the biasing force provided by the spring 252, the force pushing the lid 226 upwards can be easily predetermined. This enables the design of a kitchen device 210 with a lid 226 that is unlikely to dislodge accidentally.

The concentric design of the interlock assembly 234 is readily manufactured and located about other moving components, thereby reducing the need for complex parts and assemblies in other portions of the kitchen device 210.

Conveniently, the kitchen device 210 having the interlock assembly 234 is easily manufactured to be dish washer safe.

Use of the kitchen device 300 will now be discussed.

The accessory 303 is connected to the base 302 thereby aligning the base electromagnetic coil 334 and the lower portion 336a of the relay electromagnetic coil 336, as well as operatively connecting the motor shaft 319, and/or heater 319, with the accessory 303. The base electromagnetic coil 334 and microprocessor 386 are connected to the mains power source 355. If operation of the accessory 303 is attempted in this state, the microprocessor 386 controls the base electromagnetic coil 334 to attempt interaction with the accessory electromagnetic coil 332. In the embodiment of FIGS. 23 to 25, the attempted interaction would not succeed, as the lid 306 is not placed on the vessel 304, therefore the relay electromagnetic coil 336 cannot interact with the accessory electromagnetic coil 332. In an alternate contemplated embodiment, which has an accessory 303 that omits the relay electromagnetic coil 336 in favor of direct interaction between the base electromagnetic coil 334 and the accessory electromagnetic coil 332, the interaction results in the accessory identification signal being received by the microprocessor 386.

Food to be processed is placed via the opening 316 into the space 314. The lid 306 is placed atop the vessel 304, coupling the lid base 307 to the rim 312. This action completes the coupling 338, thereby connecting the lower portion 336a of the relay electromagnetic coil to 336 to upper portion 336b. If operation of the accessory 303 is attempted in this state, the microprocessor 386 controls the base electromagnetic coil 334 to attempt interaction with the accessory electromagnetic coil 332. The attempted interaction results in the accessory identification signal and the interlock signal being received by the microprocessor 386. In this embodiment, the sensor 340 is present, and thus the sensor signal is also received by the microprocessor 386.

The interaction between the base electromagnetic coil 334 and the accessory electromagnetic coil 332, whether or not it is performed via the relay electromagnetic coil 336, involves the microprocessor 386 acting as a base encoder/decoder, and the accessory microprocessor 380 acting as an accessory encoder/decoder. To perform the interaction, the microprocessor 386 controls the base electromagnetic coil 332 to send a first transmission to the accessory electromagnetic coil 332. The first transmission contains information encoded by the microprocessor 386 in frequency shift keying. The first transmission is received by the accessory electromagnetic coil 332 and decoded by the frequency shift keying filter 382. The first transmission is also filtered by the regulator 381, such that the carrier frequency provided by the carrier frequency generator 369 provides a source of DC power for the accessory microprocessor 380.

The microprocessor 386 further, using information encoded in frequency shift keying in the first transmission and decoded by the accessory microprocessor 380, controls the accessory microprocessor 380 to control the accessory electromagnetic coil 332 to send a second transmission to the base electromagnetic coil 334. The second transmission contains information encoded in amplitude shift keying. Information encoded in the second transmission is encoded by the accessory microprocessor 380 controlling the accessory electromagnetic coil 332 to draw varying levels of load, resulting in corresponding varying levels of potential in the base electromagnetic coil 334. The varying levels of potential in the base electromagnetic coil 334 are decoded by the ASK filter 370 such that the information encoded in the second transmission is received by the microprocessor 386.

Advantages of the kitchen device 300 will now be discussed.

The design of the transmission circuit 320 has virtually no moving parts, as only the vessel 304, lid 306, and base 302 move in relation to each other. There are no switches or levers that are repeatedly moved. This approach removes a source of possible mechanical and electrical failure.

Because all parts of the transmission circuit 320 that are mounted on or in the accessory 303 are easily mounted in a waterproof manner, as the interaction between the transmission circuit 320 and the base 302 is wireless, the accessory 303 is dishwasher-proof and less likely to entrain pieces of food in difficult-to-clean spaces.

The use of the base and accessory electromagnetic coils 334, 332 to produce an accessory identification signal allows the kitchen device 300 to accommodate, and abide by, a variety of safety standards and/or operational requirements depending on the type of accessory 303 connected to the base 302. The use of a wireless system, as outlined herein, facilitates the transmission of the accessory identification signal to the microprocessor 386, irrespective of the geometry of the accessory 303.

The use of RFID coils, and the use of the relay electromagnetic coil 336 reduces the amount of interference experiences by the coils 232, 234, 236, as only short-distance signals are sent and received.

The use of the sensor signal allows the microprocessor 386 to receive a variety of information about the state of the accessory 303. Thus, the base 302 may be compatible with a wide variety of accessories 303 requiring control by the microprocessor 386 as a function of the sensor signal of various sensors 340.

The advantageous embodiments and/or further developments of the above disclosure—except for example in cases of clear dependencies or inconsistent alternatives—can be applied individually or also in arbitrary combinations with one another.

The invention claimed is:

1. A kitchen device including:
 a base having a mechanism that is operated using electrical power to cause processing of food;
 a vessel removably mounted on the base and including a bottom wall, a side wall extending upwardly from the bottom wall to a rim so as to provide a space to receive the food to be processed, with the rim surrounding an opening to the space;
 a lid removably coupled to the rim so as to at least partially close the opening; and
 an interlock system operatively associated with the mechanism to permit the delivery of the electric power to the mechanism, the system including a first interlock circuit and a second interlock circuit, wherein delivery of the electric power to the mechanism is permitted by the completion of the first interlock circuit and activation of the second interlock circuit,
 wherein the first interlock circuit includes a first coupling to complete the first interlock circuit, the first coupling including a first portion mounted to the lid and a second portion mounted to the vessel adjacent the rim so that the first portion is located adjacent the second portion when the lid is coupled to the rim thereby completing the first interlock circuit,
 wherein the second interlock circuit includes a second coupling to activate the second interlock circuit, the second coupling including a first portion that is part of the second interlock circuit and mounted to the base, the first portion is a receiver including a photodiode being operatively associated with a second portion that is mounted to the vessel and part of the first interlock circuit, the second portion is a transmitter including a light emitting diode, wherein completion of the first interlock circuit causes operation of the transmitter thereby causing operation of the receiver to thus activate the second interlock circuit and permit delivery of the electric power to the mechanism,
wherein the first interlock circuit further includes a receiver coil and the base includes a transmitter coil, and
wherein the receiver coil is configured to receive electrical power from the transmitter coil to operate the light emitting diode when the first interlock circuit is completed.

2. The kitchen device of claim 1, wherein the lid includes a lid base that engages the rim, with the first portion of the first coupling being mounted to the lid base.

3. The kitchen device of claim 1, wherein the lid includes a lid base to engage the rim,
a feed tube extending from the lid base and communicating with the space to deliver food to the space through the feed tube, and
a pusher member slidably received in the feed tube to move the food along the feed tube to the space,
wherein the first portion and second portion of the first coupling include electrical contacts on the lid base and vessel, respectively, and
wherein the first coupling further includes:
a third portion associated with the feed tube, and
a fourth portion associated with the pusher member, such that the first interlock circuit is completed when the pusher member is in the feed tube and the lid is coupled to the rim.

4. The kitchen device according to claim 1, wherein the transmitter is arranged in a watertight manner.

5. The kitchen device according to claim 1, wherein the transmitter includes an infrared (IR) light emitting diode, and wherein the receiver includes an IR sensitive photodiode.

6. The kitchen device according to claim 1, wherein the transmitter includes a radio-frequency (RF) transmitter, and wherein the receiver includes a radio-frequency (RF) receiver.

7. The kitchen device according to any one of claim 1, wherein the second interlock circuit further comprises a plurality of transistors connected in series to operate a relay to permit delivery of the electric power to the mechanism, each transistor having a base line connected to the first portion of the second coupling so that operation of the first portion of the second coupling causes a current to flow through the plurality of transistors, thereby activating the second interlock circuit and operating the relay.

8. The kitchen device according to claim 7, wherein each base line is connected to a first plurality of resistors connected in series, and wherein the base lines of all transistors commonly connect to a second plurality of resistors connected in series before connecting to a source of electrical power.

9. The kitchen device according to claim 8, wherein the second plurality of resistors includes a first portion of resistors connected in series and a second portion of resistors connected in parallel.

10. The kitchen device according to any one of claim 1, further including:
at least one sensor mounted to the base, the at least one sensor includes a vessel sensor configured to determine whether the vessel is received on the base; and
a processor located within the base configured to receive an indication from the vessel sensor that the vessel is received on the base, wherein the processor is configured to prevent delivery of the electric power to the mechanism.

11. The kitchen device according to claim 10, wherein the at least one sensor comprises at least one of:
a load sensor that determines a load of the vessel:
a temperature sensor that determines a temperature of the vessel; and
a proximity sensor that determines a presence of the vessel.

12. The kitchen device according to any one of claim 1, wherein the mechanism includes a motor.

13. The kitchen device according to any one of claim 1, wherein the mechanism includes a heating element.

14. The kitchen device according to any one of claim 1, wherein the kitchen device includes a plurality of first portions of the second coupling, and a plurality of second portions of the second coupling.

15. The kitchen device according to claim 14, wherein any second portion of the second coupling is adapted to operate any first portion of the second coupling.

16. A method of permitting delivery of electric power to a mechanism of a kitchen device for processing food, the kitchen device having:
a base, the mechanism mounted in the base and operable using electrical power to cause processing of food;
a vessel removably mounted on the base and including a bottom wall, a side wall extending upwardly from the bottom wall to a rim so as to provide a space to receive the food to be processed, with the rim surrounding an opening to the space;
a lid removably coupled to the rim so as to at least partially close the opening;
a first interlock circuit located in the vessel includes a first coupling to complete the first interlock circuit, the first coupling including a first portion mounted to the lid and a second portion mounted to the vessel adjacent the rim so that the first portion is located adjacent the second portion when the lid is coupled to the rim thereby completing the first interlock circuit; and
a second interlock circuit located in the base includes a second coupling to activate the second interlock circuit, the second coupling including a first portion that is part of the second interlock circuit and mounted to the base, the first portion is a receiver including a photodiode being operatively associated with a second portion that is mounted to the vessel and part of the first interlock circuit, the second portion is a transmitter including a light emitting diode, wherein completion of the first interlock circuit causes operation of the transmitter, thereby causing operation of the receiver to activate the second interlock circuit and permit delivery of the electric power to the mechanism,
wherein the first interlock circuit further includes a receiver coil and the base includes a transmitter coil, the method comprising the steps of:
coupling the vessel to the base, thereby providing electrical power to the first interlock circuit from the transmitter coil;
coupling the lid to the vessel, thereby completing the first interlock circuit to operate the light emitting diode; and
after completion of the first interlock circuit, sending a non-contact output that activates the second interlock circuit thereby permitting delivery of electric power to the mechanism.

* * * * *